United States Patent
Kanazawa et al.

(10) Patent No.: US 7,283,853 B2
(45) Date of Patent: Oct. 16, 2007

(54) FOLDING TYPE PORTABLE RADIO MACHINE AND CHASSIS OF THE RADIO MACHINE

(75) Inventors: Masaru Kanazawa, Kawasaki (JP); Yoshiyuki Yamashita, Sapporo (JP); Tabito Tonooka, Kawasaki (JP); Masatomo Mori, Sapporo (JP); Hisamitsu Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 10/664,024

(22) Filed: Sep. 17, 2003

(65) Prior Publication Data

US 2004/0058721 A1    Mar. 25, 2004

(30) Foreign Application Priority Data

Sep. 20, 2002  (JP)  ............ 2002-274342
Mar. 28, 2003  (JP)  ............ 2003-092858

(51) Int. Cl.
*H04M 1/00* (2006.01)

(52) U.S. Cl. .......... 455/575.1; 455/90.1; 455/347

(58) Field of Classification Search ......... 455/550.1, 455/575.1, 575.3, 575.7, 90.3, 347, 349, 455/348
See application file for complete search history.

(56) References Cited

U.S. PATENT DOCUMENTS 2,502,832 A * 4/1950 Dockendorff ........... 455/157.1
5,705,860 A * 1/1998 Ninh et al. ............... 455/566
5,784,251 A * 7/1998 Miller et al. ............. 361/683
5,903,822 A * 5/1999 Sekine et al. .......... 455/575.7
5,995,052 A   11/1999 Sadler et al.
5,999,831 A * 12/1999 Itoh ...................... 455/575.7
6,011,699 A * 1/2000 Murray et al. .......... 455/575.1
6,246,374 B1  6/2001 Perrotta et al.
6,266,538 B1  7/2001 Waldron
6,314,273 B1 * 11/2001 Matsuda .................. 455/349
6,327,485 B1  12/2001 Waldron

FOREIGN PATENT DOCUMENTS

| JP | 11-317610   | 11/1999 |
|----|-------------|---------|
| JP | 2000-216611 | 8/2000  |
| JP | 2001-077623 | 3/2001  |
| JP | 2002-246821 | 8/2002  |

OTHER PUBLICATIONS

European Search Report, dated Jun. 7, 2006, for related European Patent Application No. EP0325 5676.3-2411.

* cited by examiner

*Primary Examiner*—Lana N. Le
(74) *Attorney, Agent, or Firm*—Staas & Halsey LLP

(57) ABSTRACT

A folding type portable radio machine, includes a chassis part formed by a first chassis and a second chassis, the second chassis being foldably connected to the first chassis. The chassis part includes a conductive part having conductivity whose full length is an approximately half wave length ($\lambda/2$) of a using frequency of the radio machine, and an electric notch.

20 Claims, 20 Drawing Sheets (a) (b)

FOLDING TYPE PORTABLE RADIO MACHINE AND CHASSIS OF THE RADIO MACHINE

BACKGROUND OF THE INVENTION

1. Field of the Invention

The present invention generally relates to folding type portable radio machines and chassis of the radio machines, and more particularly, to a folding type portable radio machine, which is folded at the time of being carried and unfolded at the time of being used for telephone calling or communicating, and a chassis for the phone.

2. Description of the Related Art

A folding type portable radio machine such as a folding type portable phone, including a chassis for the phone, is folded at the time of being carried. The radio machine is unfolded at the time of being used for telephone calling or communicating, and if necessary an antenna installed inside thereof is extended externally.

FIG. 1 is an exploded perspective view of a related art folding type portable phone 10. Referring to FIG. 1, the related art folding type portable phone 10 includes a dial operations key side part 11 held by the hands of a user, a liquid crystal side part 12 which is folded and unfolded, a left hinge mechanism part 13a, a right hinge mechanism part 13b, and others.

The left hinge mechanism part 13a and the right hinge mechanism part 13b are respectively provided at left and right sides of the folding type portable phone 10 so as to connect the dial operations key side part 11 to the liquid crystal side part 12.

The dial operations key side part 11 is formed by combining a plate part 20 and a lower part housing 21. A lower part chassis 23 where a printed board module 22 is provided is installed inside of the dial operations key side part 11.

The liquid crystal side part 12 is formed by combing a plate part 30 and an upper housing 31. An upper part chassis 34 where a printed board module 32 is provided is installed inside of the liquid crystal side part 12.

The left hinge mechanism part 13a is covered with an arc part 23 projecting from an edge of the plate part 20 of the dial operations key side part 11. The right hinge mechanism part 13b is covered with an arc part 33 projecting from an edge of the plate part 30 of the liquid crystal side part 12.

Furthermore, the printed board module 22 of the dial operations key side part 11 and the printed board module 32 of the liquid crystal side part 12 are connected by a flexible printed board 40. The flexible printed board 40 forms a curl configuration at a designated position thereof. In addition, an antenna 45 is flexibly received in the lower part housing 21 of the dial operation key side part 11. A battery pack 46 is fitted on a lower surface of the lower part housing 21.

Meanwhile, the upper part chassis 34 and the lower part chassis 23 are molded articles which are made of resin and where metal is vaporized. Furthermore, metal is vaporized on both left hinge mechanism part 13a and the right hinge mechanism part 13b so that there is conductivity between the dial operation key side part 11 and the liquid crystal side part 12. Alternatively, metal is vaporized on neither left hinge mechanism part 13a nor the right hinge mechanism part 13b so that there is no conductivity between the dial operation key side part 11 and the liquid crystal side part 12.

FIG. 2 is a schematic view of the upper part chassis 34 and the lower part chassis 23 in a case where the related art folding type portable phone 10 is folded. More specifically, FIG. 2-(a) is a view seen in the X-Y plane of FIG. 1 and FIG. 2-(b) is a view seen in Y-Z plane of FIG. 1.

Referring to FIG. 1 and FIG. 2, when the folding type portable phone is carried, the upper housing 31 where the upper part chassis 34 is provided inside is closed against the lower housing 21 where the lower part chassis 23 is provided inside. In this case, as shown in FIG. 2, even if the antenna 45 is extended, the upper part chassis 34 is not an obstacle to transmission and receipt of the radio wave by the antenna 45.

For example, as shown in Japanese Laid-Open Patent Application No. 2002-246821, in a conventional antenna for portable communication terminals, when a plate antenna is held so as to be separated from a human body by 20 mm, the gain of the plate antenna can be made higher by 2.5 dB or more over the entire frequency band (1,920-2,170 MHz), than the gain of a half-wave length dipole antenna.

Furthermore, as shown in Japanese Laid-Open Patent Application No. 2000-216611, there is a conventional folding type mobile phone, wherein a monopole antenna is formed by first and second conductive films provided at first and second housings when the phone is unfolded, and the second conductive film acts like a grounding plane when the phone is folded.

As shown in Japanese Laid-Open Patent Application No. 11-317610, there is a conventional antenna of a folding type portable phone that functions as a monopole antenna in a normal operation state and as a slot antenna in a standby state.

Furthermore, as shown in Japanese Laid-Open Patent Application No. 2001-77623, there is a small-sized antenna in a stack structure with sufficient passing band width achieved by eliminating mutual interference by coupling a resonance structure, which has a high center frequency ratio on both sides of a coupling layer made of a planar conductive layer, with an external processing unit via a slit formed in the coupling layer.

However, in a case where the folding type portable phone 10 is unfolded and the antenna 45 is extended in order to conduct communications and telephone calling, there might be the following problems with regard to transmission and receipt of the radio wave.

FIG. 3 is a schematic view of the upper part chassis 34 and the lower part chassis 23 in a case where the related art folding type portable phone 10 is unfolded. More specifically, FIG. 3-(a) is a view seen in the X-Y plane of FIG. 1 and FIG. 3-(b) is a view seen in the Y-Z plane of FIG. 1.

Referring to FIG. 1 and FIG. 3, when the communicating or telephone calling is implemented, the upper housing 31 where the upper part chassis 34 is provided inside thereof is rotated against the lower housing 21 where the lower part chassis 23 is provided inside thereof so that the folding type portable phone 10 is unfolded and the antenna 45 is extended.

In this case, as shown in FIG. 3, the upper part chassis 34 is situated right at the side of the antenna 45. Hence, the upper part chassis 34 is an obstacle for the antenna 45 to transmit and receive the radio wave.

Therefore, the gain of the antenna 45 is degraded so that an radiation efficiency is reduced. Because of this, it may be difficult to implement a high quality telephone call or communications by the related art folding type portable phone 10.

Furthermore, the conventional portable radio machine such as the folding type portable phone 10 shown in FIG. 1 through FIG. 3 generally has an outside antenna such as a helical antenna or a monopole antenna, or an installed antenna such as chip antenna, a plate antenna, or a batch antenna.

In addition, in order to realize the portable radio machine being applied to Bluetooth or a radio LAN based on multi-functionalization of a recent communications developments, it is required for the portable radio machine to have antennas corresponding to respective frequencies of transmission.

Hence, spaces in which the respective antennas are to be provided is required in the portable radio machine. In addition, the folding portable radio machine is required to be further miniaturized and reduced in weight.

However, it is difficult for the related art portable radio machines to accomplish both multi-functionalization of the communications and miniaturization and weight savings of the radio machine.

SUMMARY OF THE INVENTION

Accordingly, it is a general object of the present invention to provide a novel and useful folding type portable radio machine and a chassis of the radio machine in which one or more of the problems described above are eliminated.

Another and more specific object of the present invention is to provide a folding type portable radio machine having a simple structure which can transmit and receive a radio wave efficiently and realize high quality communications, a multifunctional communications and the like, and a chassis of the radio machine.

The above objects of the present invention are achieved by a folding type portable radio machine, including:

a chassis part formed by a first chassis and a second chassis, the second chassis being foldably connected to the first chassis, wherein the chassis part includes:

a conductive part having conductivity whose full length is an approximately half wave length ($\lambda/2$) of a using frequency of the radio machine, and an electric notch.

The above objects of the present invention are achieved by a folding type portable radio machine, including:

a first chassis having conductivity; and a second chassis having conductivity and being foldably connected to the first chassis by a hinge mechanism part, wherein the hinge mechanism part has a part making the first chassis and the second chassis have an electric continuity state, and a part not making the first chassis and the second chassis have the electric continuity state, and a full length of the first chassis and the second chassis is an approximately half wave length ($\lambda/2$) of a using frequency of the radio machine.

The above objects of the present invention are achieved by a folding type portable radio machine, including:

a first housing having a first chassis having conductivity where a printed board is provided inside thereof;

a second housing having a second chassis having conductivity where another printed board is provided inside thereof;

an antenna being extendable to a back surface of the first housing, the antenna being provided at one of left and right sides of the second housing;

wherein the antenna is fed an electric power supply by a feeder circuit of the other printed board provided at the second chassis, the first chassis and the second chassis are connected by connection parts provided left and right, the connection part at the side where the antenna is positioned non-electrically connects the first chassis and the second chassis, the connection part at the other side electrically connects the first chassis and the seconds chassis, and a full length of the radio machine is an approximately half wave length ($\lambda/2$) of a using frequency of the radio machine.

The above objects of the present invention are achieved by a folding type portable radio machine, including:

a first housing that has a first chassis having conductivity, the first housing having a printed board provided inside thereof; and a second housing that has a second chassis having conductivity, the second housing having another printed board provided inside thereof;

wherein the first chassis and the second chassis are physically connected by a first connection part and a second connection part provided left and right, the first connection part electrically connects the first chassis and the second chassis, the second connection part does not electrically connect the first chassis and the second chassis, a full length of the radio machine in a case where the first housing is opened from the second housing is an approximately half wave length ($\lambda_1/2$) of a first using frequency of the radio machine;

an interval between the first connection part and the second connection part is an approximately one fourth wave length ($\lambda_2/4$) of a second using frequency of the radio machine; and the first chassis, the second chassis, the first connection part, and the second connection part, as an installed antenna of the radio machine, send and receive radio waves having the first and second using frequencies.

The above objects of the present invention are achieved by a chassis provided inside of a folding type portable radio machine, comprising:

a first chassis part;

a second chassis part; and a plurality of connection parts provided at the first chassis part and the second chassis part, the connection parts connecting the first chassis part and the second chassis part;

wherein only a surface of one of the connection parts at the second chassis part connecting to the one of the connection parts at the first chassis part is made of non-conductive material.

Other objects, features, and advantages of the present invention will become more apparent from the following detailed description when read in conjunction with the accompanying drawings.

BRIEF DESCRIPTION OF THE DRAWINGS

FIG. 12 is folded;

DETAILED DESCRIPTION OF THE PREFERED EMBODIMENTS

A description will now be given, with reference to the FIGS. 4-27, of embodiments of the present invention. In the following embodiments, folding type portable phones and a chassis of phones are described as examples of a folding type portable radio machine and a chassis thereof.

First Embodiment

Figure 1:
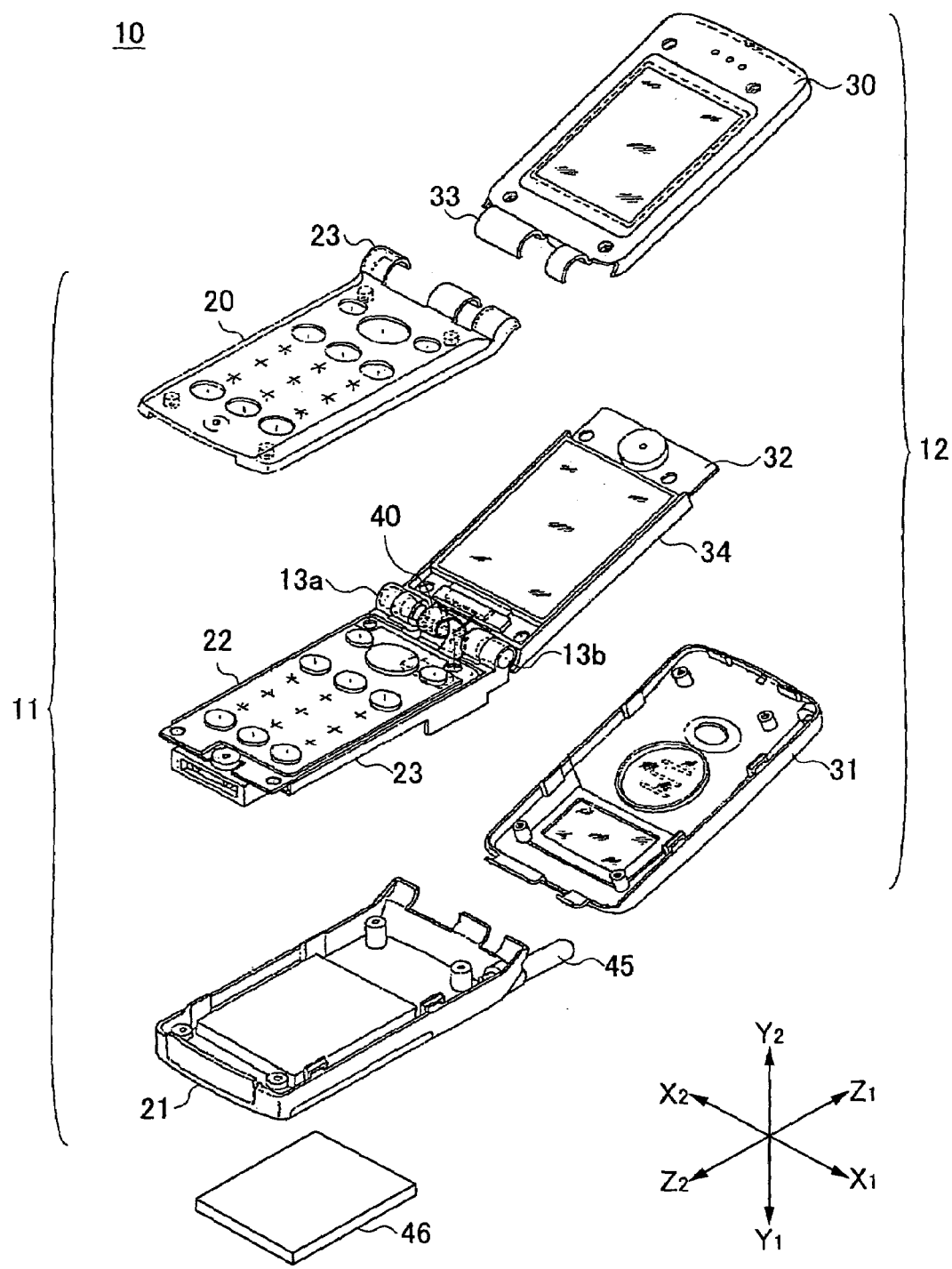
FIG. 1 is an exploded perspective view of he related art folding type portable phone 10.
Figure 2:
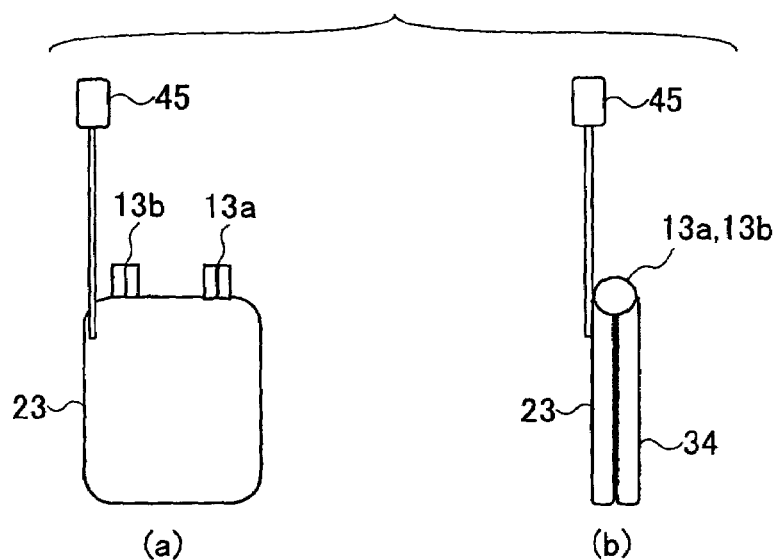
FIG. 2 is a schematic view of the upper part chassis 34 and the lower part chassis 23 in a case where the related art folding type portable phone 10 is folded.
Figure 3:
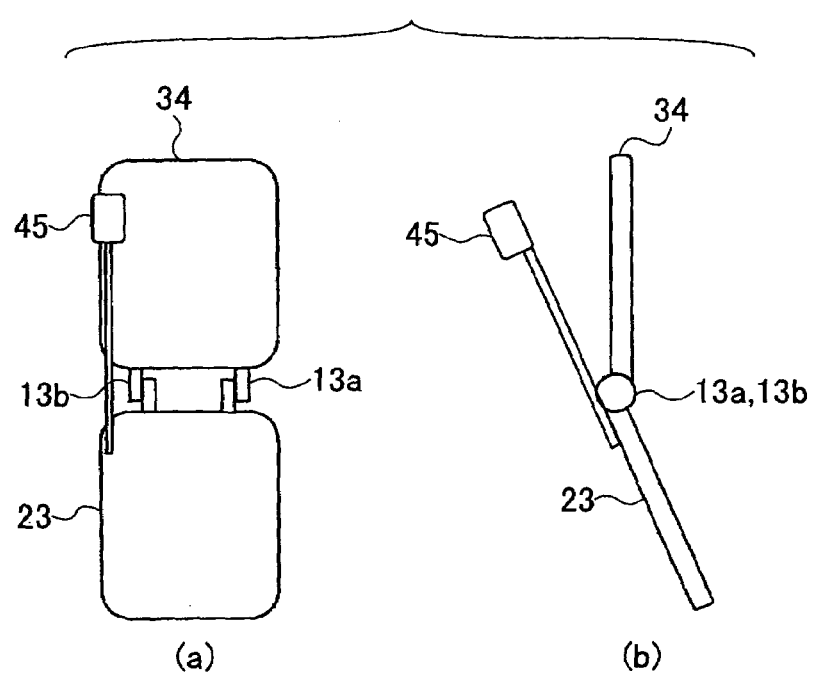
FIG. 3 is a schematic view of the upper part chassis 34 and the lower part chassis 23 in a case where the related art folding type portable phone 10 is unfolded.
Figure 4:
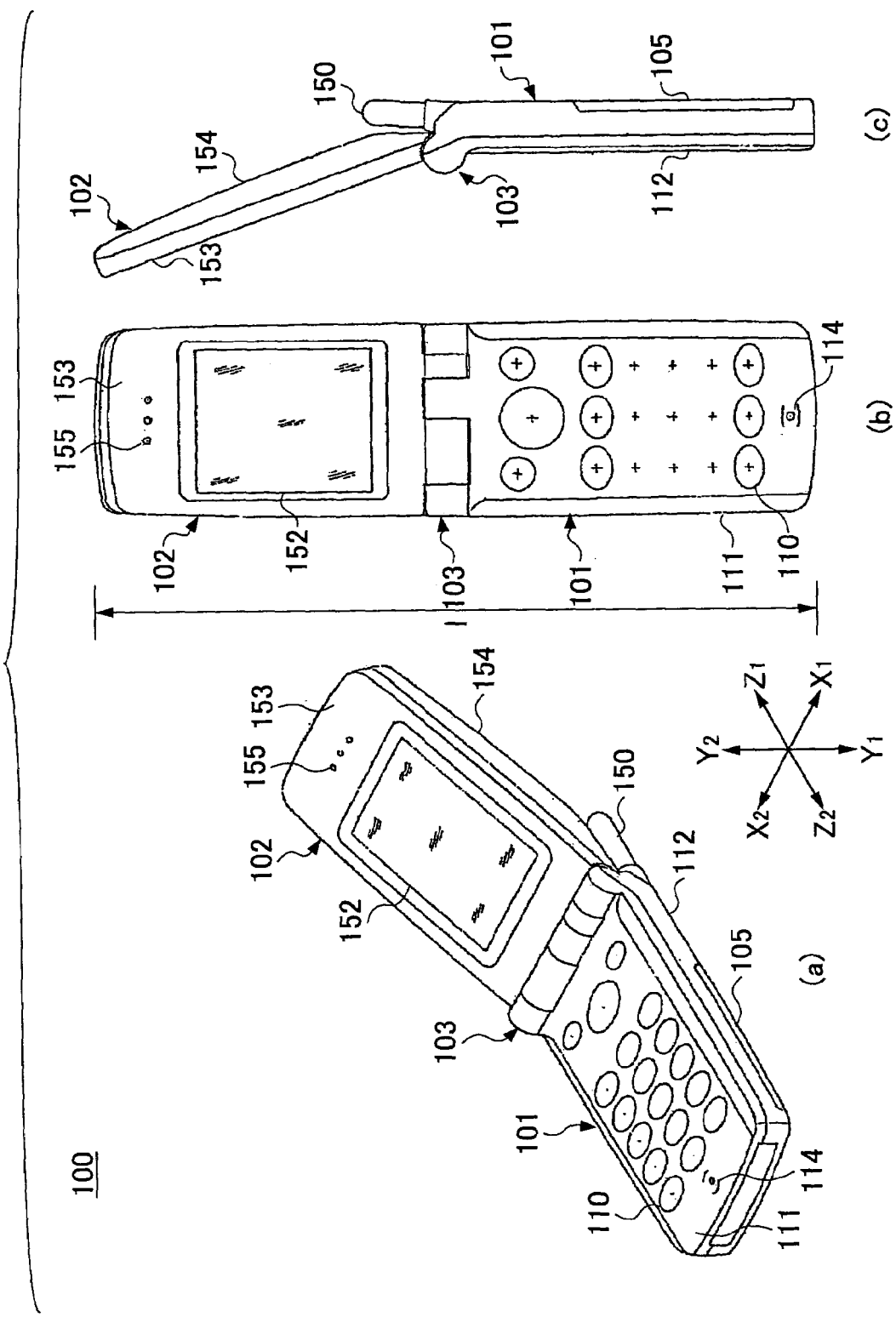
FIG. 4 provides three views of a folding type portable phone 100 of a first embodiment of the present invention in a case where the folding type portable phone 100 is unfolded.

FIG. 4 provides views of a folding type portable phone 100 of a first embodiment of the present invention in a case where the folding type portable phone 100 is unfolded. More specifically, FIG. 4-(a) is a perspective view of the folding type portable phone 100, FIG. 4-(b) is a plan view of the folding type portable phone 100, and FIG. 4-(c) is a side view of the folding type portable phone 100.

Referring to FIG. 4, the folding type portable phone 100 of the first embodiment of the present invention includes an operation key part 101, a liquid crystal display part 102, a connection part 103 for connecting the operation key part 101 and the liquid crystal display part 102, and others.

The operation key part 101 is formed by combining an input key board 111 and a lower part housing 112. An input key 110 for inputting a phone number and others is provided at the input key board 111. A first printed board module 117 (See FIG. 12) described below and others are installed in the lower part housing 112.

A microphone 114 for gathering voice sounds of the user during telephone calling is provided at a lower part of the input key board 111. Furthermore, an extensible whip antenna 150 for sending and receiving is provided at the right side of the inside of the lower part housing 112.

The liquid crystal display part 102 is formed by combining a liquid crystal display board 153 and an upper housing 154. A liquid crystal display 152 for displaying a picture or a phone number is provided at the liquid crystal display part 152.

A second printed board module 157 (See FIG. 12) described below and others are installed in the upper part housing 154. A speaker 155 for outputting voice sounds of a remote participant of a telephone call is provided at an upper part of the liquid crystal display board 153. Furthermore, a battery pack 105 is provided at a lower surface of the operation key part 101 as an electric power supply part.

When the folding type portable mobile phone 100 is carried, namely at the time of waiting for a telephone call or not communicating, the liquid crystal display part 102 is folded to the operation key part 101.

When communications or telephone calling is initiated, the operation key part 101 is held by a hand of the user and the liquid crystal display part 102 is rotated at the connection part 103 as a center by manual effort so that the folding type portable mobile phone 100 is unfolded. Furthermore, the antenna 150 is extended from the lower part housing 112.

In addition, the full length (the length in a longitudinal direction) of the folding type portable phone 100, namely the length "l" shown in FIG. 4-(b), is set so as to be an approximately half length of the wave length (hereinafter "λ") of a frequency being used.

Meanwhile, gamma matching is used as a matching method for supplying energy efficiently from a feeder line to an antenna.

Figure 5:
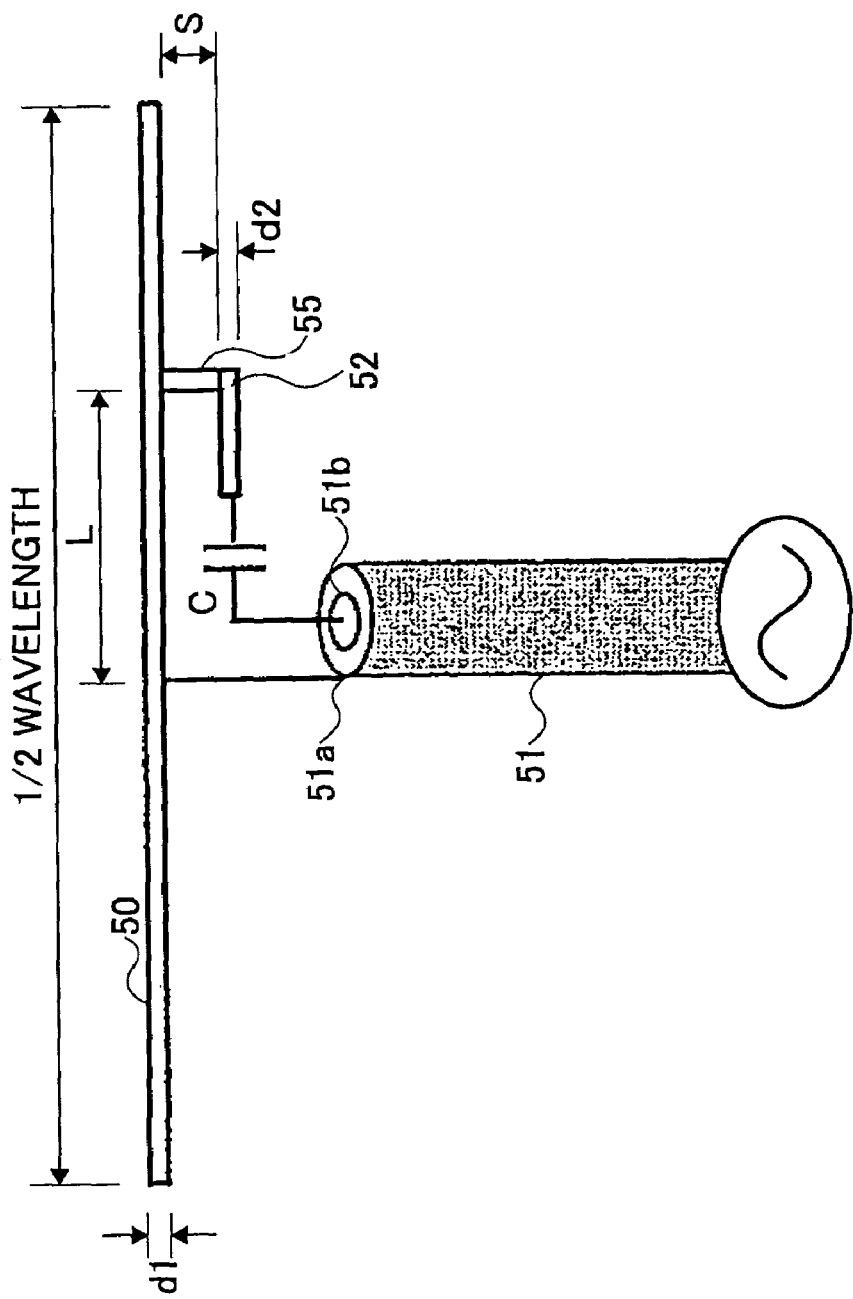
FIG. 5 is a view for explaining gamma matching.

FIG. 5 is a schematic view for explaining the gamma matching. Referring to FIG. 5, the conductive antenna 50 has a full length of approximately λ/2. An electric power supply is provided to the antenna 50 by a coaxial cable 51. An external conductor 51a of the coaxial cable 51 is connected at a substantially center part of the antenna 50.

Furthermore, an internal conductor 51b of the coaxial cable 51 is connected to one end of the first connection part 52 which is conductive, via the condenser (capacitor) C. Another end of the first connection part 52 is connected to one end of a second connection part 55. Another end of the second connection part 55 is connected to the antenna 50. In FIG. 5, d1 represents the diameter of the antenna 50, d2 represents the diameter of the first connection part 52, S represents the length of the second connection part 55, and L represents the length (distance) from the coaxial cable 51 to the second connection part 55.

Figure 6:
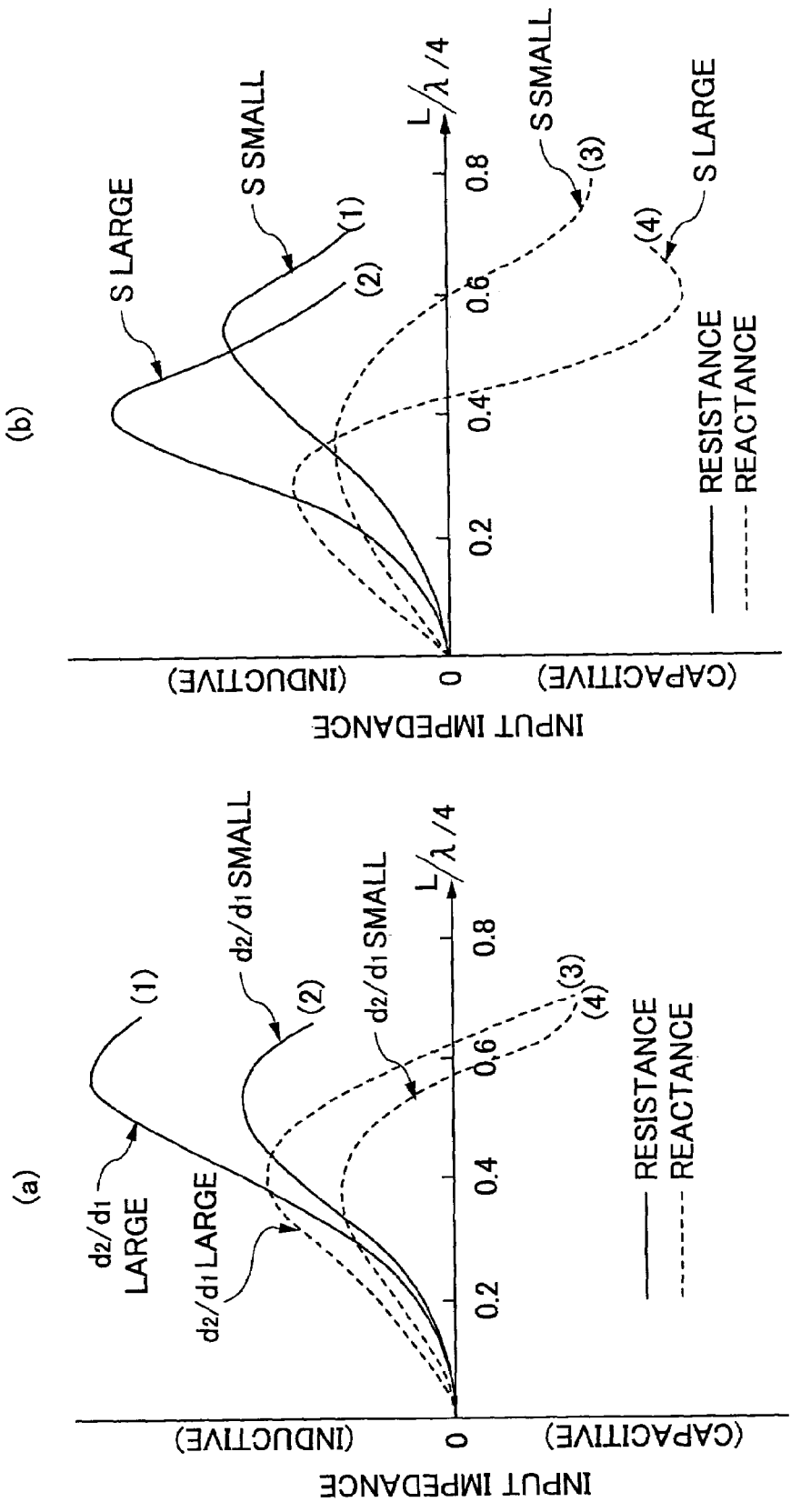
FIG. 6 provides graphs indicating a change of input impedance at the gamma matching shown in FIG. 5.

FIG. 6 provides graphs indicating a change of input impedance at the gamma matching shown in FIG. 5. Referring to FIG. 6, the vertical axis of the graph represents input impedance and the horizontal axis of the graph represents a ratio of the length "L" between the coaxial cable 51 and the second connection part 55 and $\lambda/4$.

A graph in FIG. 6-(a) shows a change of the input impedance in a case where the length "S" of the second connection part 55 and the diameter $d_2$ of the first connection part 52 in FIG. 5 are constant.

Referring to the graph shown in FIG. 6-(a), a curved line (1) shown by a solid line represents an input impedance of a resistance in a case where $d_2/d_1$ that is a ratio of the diameter $d_2$ of the first connection part 52 to the diameter $d_1$ of the antenna 50 is large. A curved line (2) shown by a solid line represents an input impedance of a resistance in a case where $d_2/d_1$ is small. A curved line (3) shown by a dotted line represents an input impedance of a reactance in a case where $d_2/d_1$ is large. A curved line (4) shown by a dotted line represents an input impedance of a reactance in a case where $d_2/d_1$ is small.

A graph in FIG. 6-(b) shows a change of the input impedance in a case where the diameter $d_1$ of the antenna 50, the diameter $d_2$ of the first connection part 52, and $d_2/d_1$, that is the ratio of the diameter $d_2$ of the first connection part 52 to the diameter $d_1$ of the antenna 50, are constant.

Referring to FIG. 6-(b), a curved line (1) shown by a solid line represents an input impedance of a resistance in a case where the length "S" of the second connection part 55 is small. A curved line (2) shown by a solid line represents an input impedance of a resistance in a case where a length "S" of the second connection part 55 is large. A curved line (3) shown by a dotted line represents an input impedance of a reactance in a case where the length "S" of the second connection part 55 is small. A curved line (4) shown by a dotted line represents an input impedance of a reactance in a case where the length "S" of the second connection part 55 is large.

As shown in FIG. 6, the input impedance is changed in a wide range by changing the capacity (capacitance) of the condenser C (See FIG. 5), the diameter $d_1$ of the antenna 50 (See FIG. 5), the diameter $d_2$ of the first connection part 52 (See FIG. 5), the length "S" of the second connection part 55 (See FIG. 5), and length "L" between the coaxial cable 51 (See FIG. 5), and the second connection part 55.

Therefore, it is possible to accomplish impedance matching by selecting proper values of the above mentioned length "L", the length "S", and the capacity of the condenser "C" so as to achieve the same value of impedance, 50 [$\Omega$], as the coaxial cable 51. Inventors of the present invention found that impedance matching of the coaxial cable 51 and the antenna 50 whose full length is approximately $\lambda/2$, in a case where the length "L" is approximately $\lambda/4$, the length "S" is a sufficiently short as compared to $\lambda$ (for example, approximately $\lambda/10$ or less), and the condenser "C" has a capacity value sufficient to negate(deny) the inductive reactance of the input impedance of the antenna 50.

Figure 7:
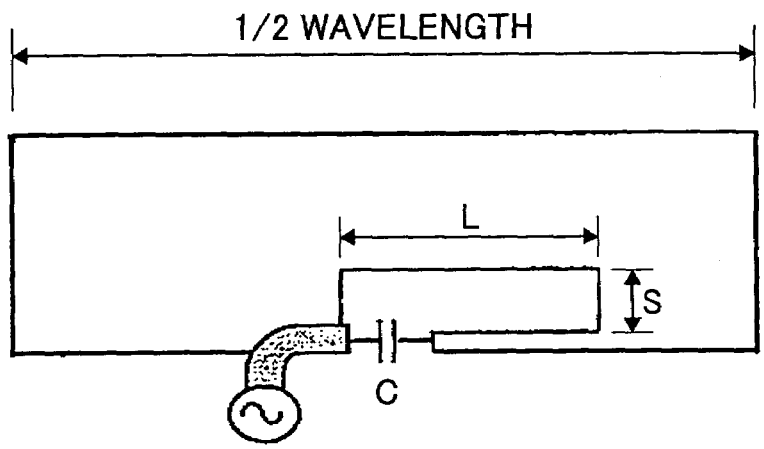
FIG. 7 is a modified schematic view of the gamma matching shown in FIG. 5 and is an equivalent view to FIG. 5.
Figure 8:
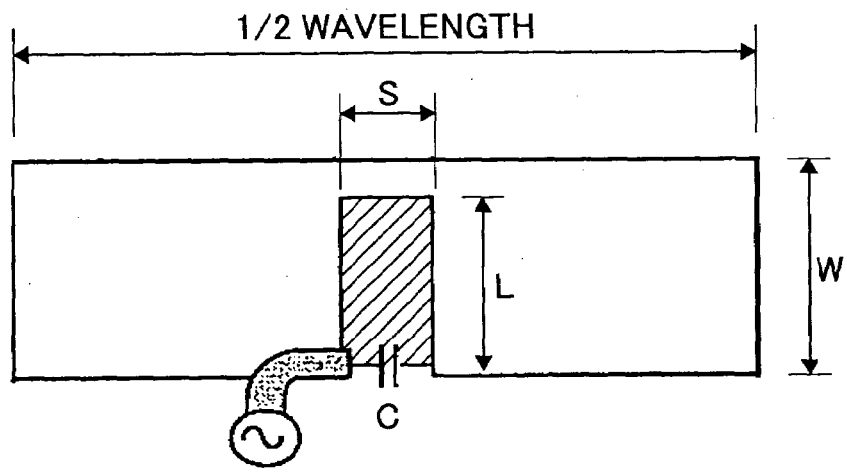
FIG. 8 is a modified schematic view of the gamma matching shown in FIG. 7 and is an equivalent view to FIG. 5 and FIG. 7.

Meanwhile, FIG. 5, which is a view for explaining the gamma matching, can be redrawn to FIG. 7 and FIG. 8. FIG. 7 is a modified view of the gamma matching shown in FIG. 5 and is an equivalent view to FIG. 5. FIG. 8 is a modified view of the gamma matching shown in FIG. 7 and is an equivalent view to FIG. 5 and FIG. 7.

Referring to FIG. 8, the inventors of this application found that matching whereby the same impedance as the coaxial cable 51 is achieved is accomplished in a case where the length "S" is sufficiently short as compared to $\lambda$ (for example, approximately $\lambda/10$ or less), the condenser "C" has a capacity value to deny the inductive reactance of the input impedance of the antenna 50, the length "W" is of a length not effecting the antenna 50 such as $\lambda/4$ or less, and the length L is shorter than the length W.

As shown in FIG. 6, in a case where the length "L" is short, resistance is small and a radiation of the antenna is degraded. Hence, it is necessary for the length "L" to be $\lambda/10$ or more. The length "L" is not necessarily a segment line but may be bent at a right angle, for example.

The inventors of this application found that in cases of 900 [MHz] band and 1.5 [GHz] band of frequencies, when the length "L", the length "S" and the capacity of the condenser "C" are set as shown in the following table 1, an excellent radiation efficiency [dB] as shown in table 1 can be achieved.

TABLE 1

|  | FREQUENCY | |
| --- | --- | --- |
|  | 900 MHz Band | 1.5 GHz Band |
| $\lambda/2$ [mm] | 170 | 100 |
| L [mm] | 37 | 20 |
| W [mm] | 47 | 23.5 |
| S [mm] | 10 | 5 |
| C [pF] | 0.5 | 0.25 |
| Radiation Efficiency [dB] | 0.5 | −0.3 |

Figure 9:
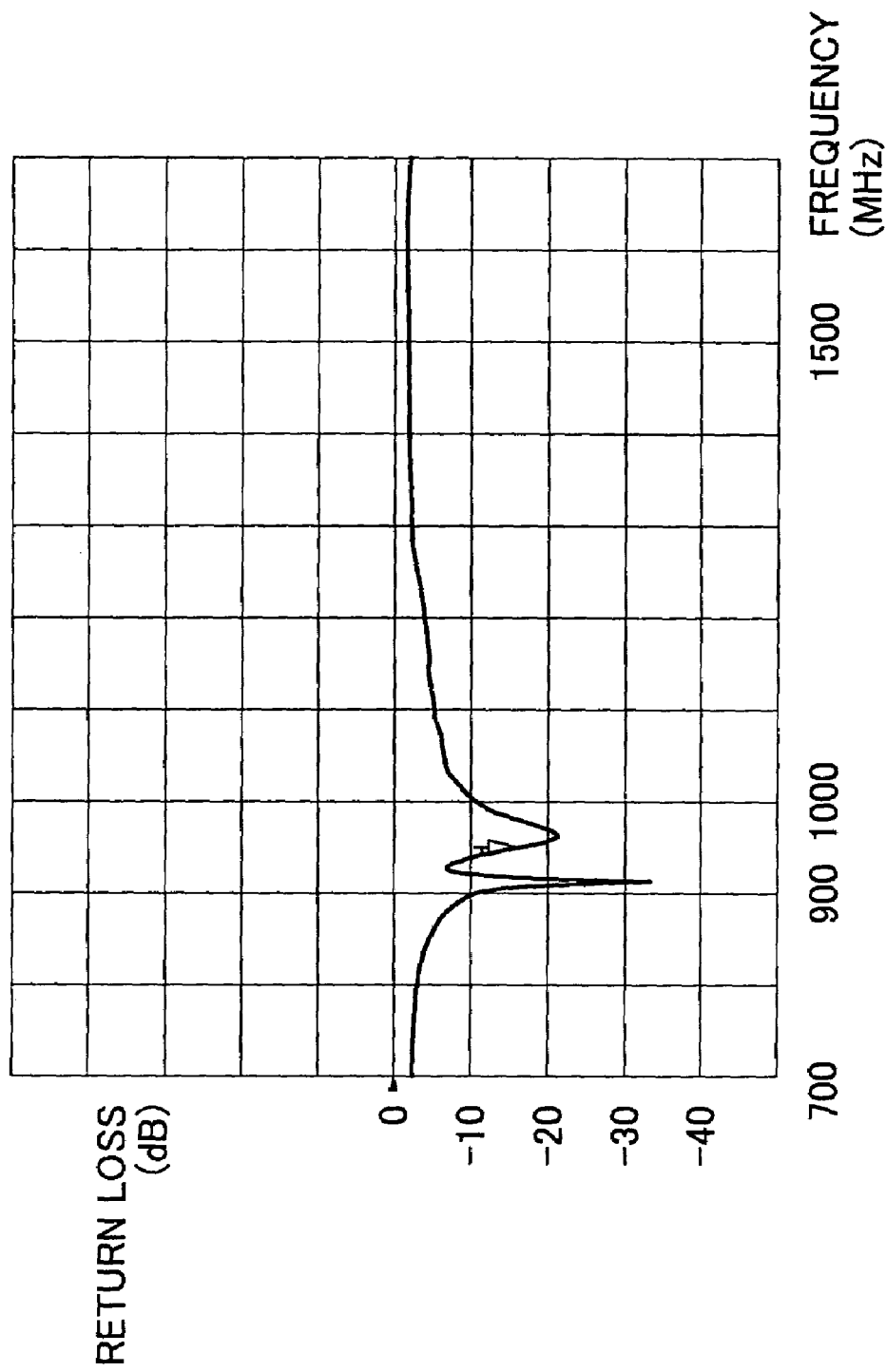
FIG. 9 is a graph indicating an impedance characteristic of 900 [MHz] frequency under conditions shown in table 1.

In a case of 900 [MHz] band of frequencies, when the length "L", the length "S" and the capacity of the condenser "C" are set as shown in the above table 1, an impedance characteristic shown in the graph of FIG. 9 is achieved.

Figure 10:
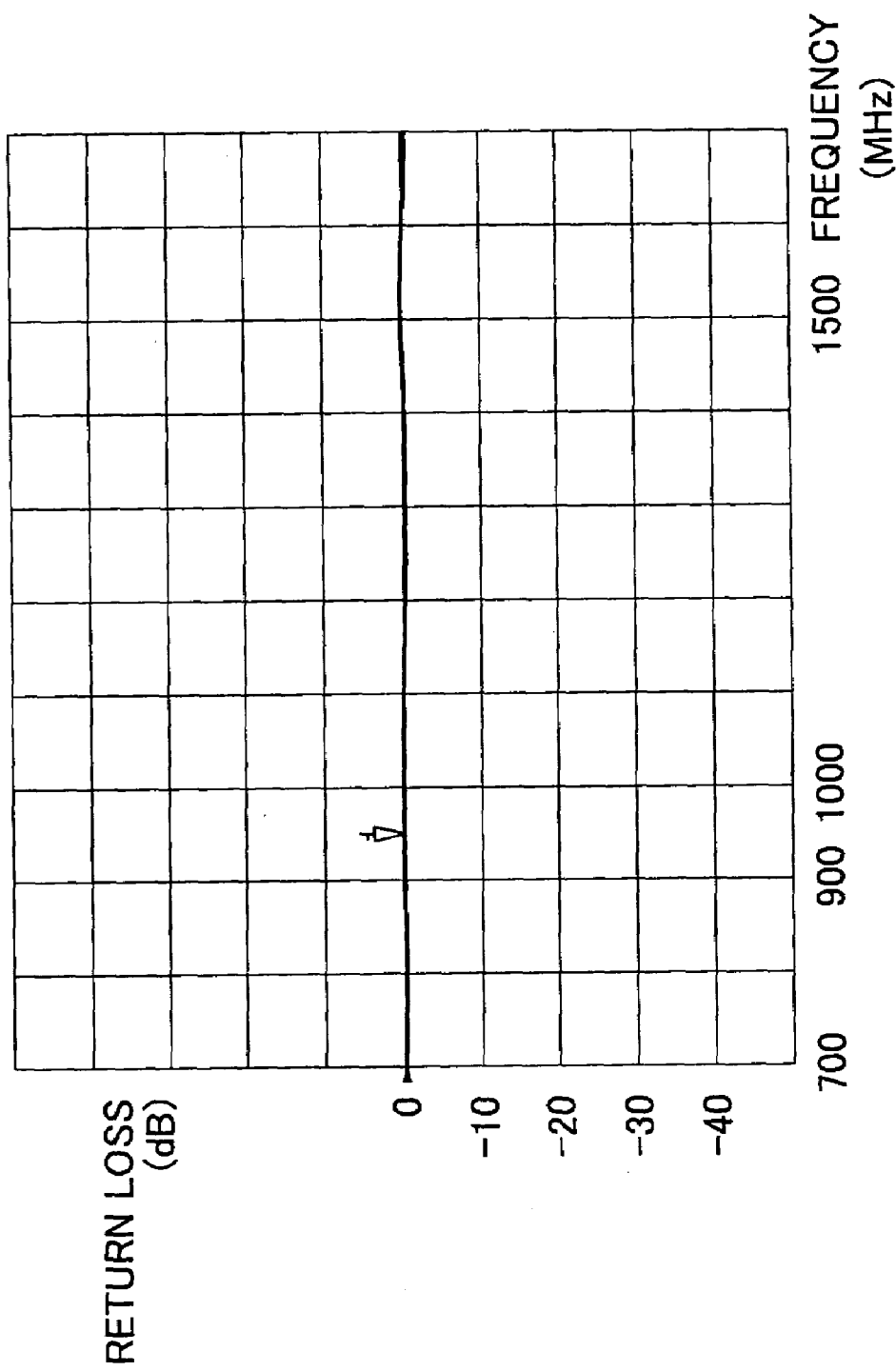
FIG. 10 is a graph indicating an impedance characteristic of 900 [MHz] frequency in a case where L in the table 1 is 0 (zero)

Furthermore, in a case of 900 [MHz] band of frequencies when the length "S" and the capacity of the condenser "C" are set as shown in the above table 1 and the length "L" is set as 0 (zero), an impedance characteristic shown in a graph of FIG. 10 is achieved.

Figure 11:
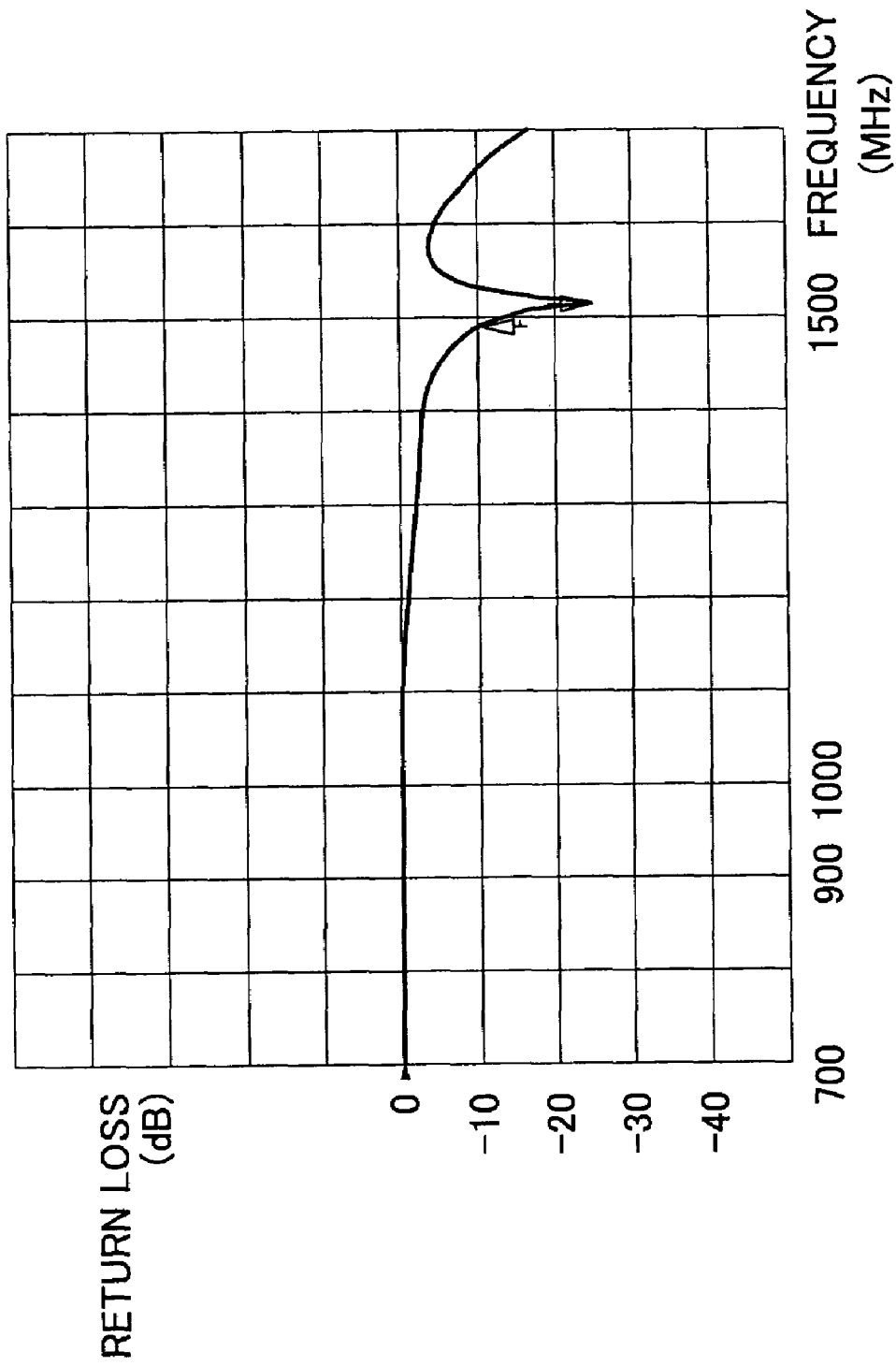
FIG. 11 is a graph indicating an impedance characteristic of 1.5 [GHz] frequency under conditions shown in table 1.

In addition, in a case of 1.5 [GHz] band of frequencies, when the length "L", the length "S" and the capacity of the condenser "C" are set as shown in the above table 1, an impedance characteristic shown in a graph of FIG. 11 is achieved.

Referring to FIG. 9 through FIG. 11, horizontal axes represent frequencies [MHz] and vertical axes represent return loss [dB], that is, a level loss against input. For example, if the return loss is 0(zero) [dB], all of the input are reflected.

As shown in the graph of FIG. 9, under conditions shown in table 1, when the frequency is between 900 [MHz] and 1000 [MHz], an excellent value of −10 [dB] through −30 [dB] of return loss is obtained so as to obtain impedance matching.

However, as shown in FIG. 10, when the length "L" is set to 0 (zero), return loss against any frequency is 0 (zero) [dB] so that all of input are reflected. That is, by setting conditions as shown in table 1, the impedance matching is obtained as shown in FIG. 9 and FIG. 10.

Furthermore, as shown in the graph in FIG. 11, under the conditions shown in table 1, when the frequency is approximately 1.5 [GHz], an excellent value of return loss between −20 [dB] and −30 [dB] is obtained so that the impedance matching is obtained.

Therefore, as described above, the full length of the folding type portable phone 100 of the first embodiment of the present invention shown in FIG. 4, namely the length "l" shown in FIG. 4-(b) is set to a length of an approximately half wave length (λ/2) of a using frequency and the folding type portable phone 100 has a structure wherein the above describe gamma matching can be applied, so that it is possible to obtain the impedance matching.

Figure 12:
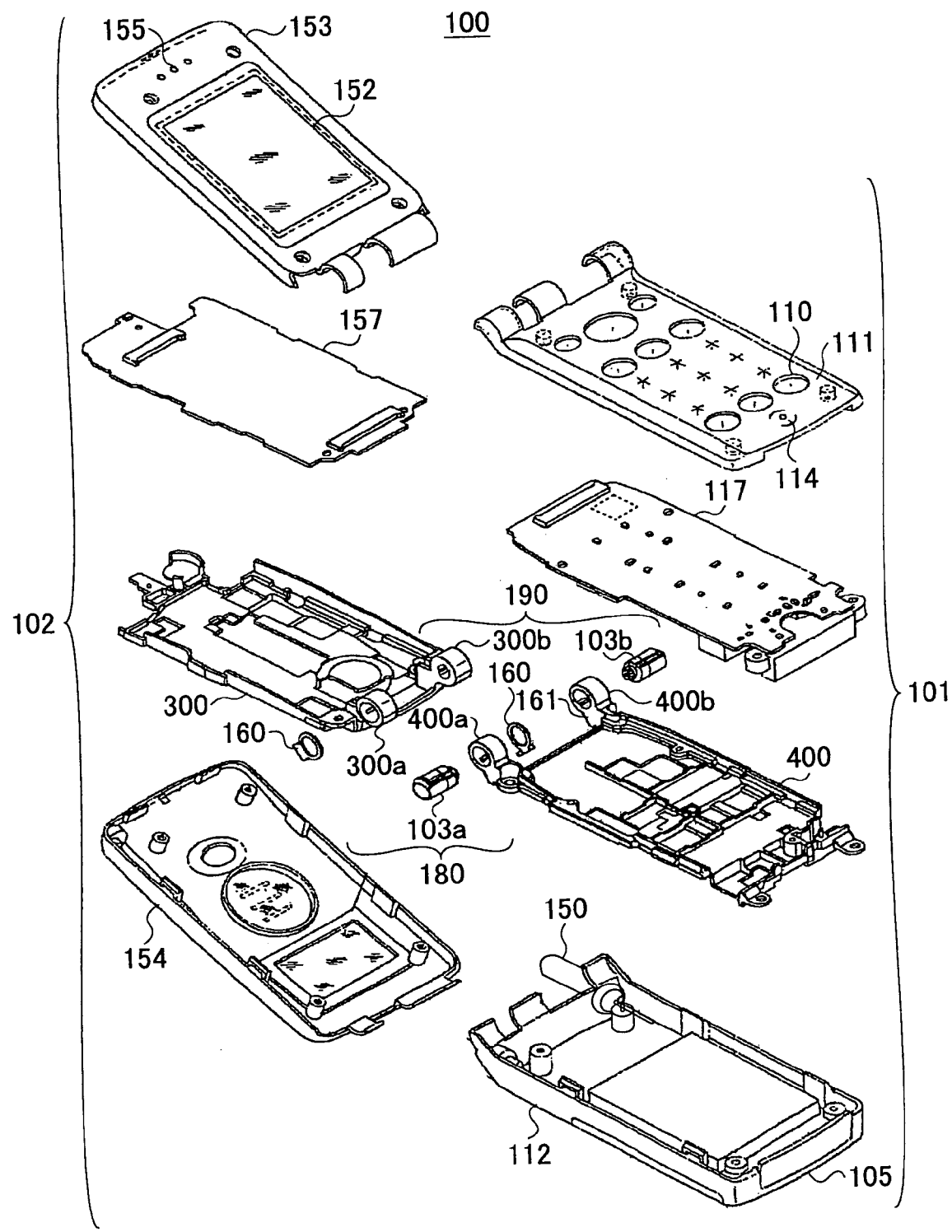
FIG. 12 is an exploded perspective view of the folding type portable phone 100 of the first embodiment of the present invention shown in FIG. 4.

Next, a structure of the folding type portable phone 100 of the present invention wherein the above mentioned gamma matching is applied is described. FIG. 12 is an exploded perspective view of the folding type portable phone 100 of the first embodiment of the present invention shown in FIG. 4.

Referring to FIG. 12, a second printed board module 157 of a liquid crystal display part 102 is provided at an upper part chassis 300 which functions as a first chassis part. Furthermore, the upper part chassis 300 is provided inside of an upper housing 154, which functions as a first housing. In addition, a first printed board module 117 of an operation key part 101 is provided at a lower part chassis 400 which functions as a second chassis part. Furthermore, the lower part chassis 400, is provided inside of a lower housing 112, which functions as a second housing.

The upper part chassis 300 is made of metal such as aluminum, nickel, or the like, or by vapor-depositing metal material such as aluminum, nickel, magnesium or the like on synthetic resin. The upper part chassis 300 and an earth conductor pattern of the second printed board module 157 are electrically connected via a spring member or the like.

The upper part chassis 300 is rotatably connected to the lower part chassis 400 via the left hinge mechanism part 180 and the right hinge mechanism part 190.

The left hinge mechanism part 180 includes a left hinge 103a, a left connection part 300a functioning as a first connection part and provided at a lower part of the upper part chassis 300, and a left connection part 400a functioning as a second connection part and provided at an upper part of the lower part chassis 400. Similarly, the right hinge mechanism part 190 includes a right hinge 103b, a right connection part 300b provided at a lower part of the upper part chassis 300, and a left connection part 400b provided at an upper part of the lower part chassis 400.

Both of the left connection parts 300a and 400a have hollow configurations so that the left hinge 103a can be inserted. Similarly, both of the right connection parts 300b and 400b have hollow configurations so that the right hinge 103b can be inserted.

The lower part chassis 400 is made of metal such as aluminum, nickel, or the like, or by vapor-depositing metal material such as aluminum, nickel, magnesium or the like on synthetic resin. The right connection part 400b provided at an upper part of the lower part chassis 400 is made of non-conductive material such as synthetic resin on which metal material is not vapor-deposited. For example, the lower part chassis 400 is formed by vapor-depositing the above mentioned metal material on the synthetic resin in a state where the right connection part 400b is masked.

Therefore, when the upper part chassis 300 and the lower part chassis 400 are connected by the left hinge mechanism part 180 and the right hinge mechanism part 190, there is continuity between the left connection part 300a and 400a where the left hinge 103a is inserted and there is no continuity between the right connection part 300b and 400b where the right hinge 103b is inserted.

In order to have more reliable continuity at a side of the left hinge 103a, a connection fitting having a hollow configuration may be put between the left connection part 300a provided at a lower part of the upper part chassis 300 and the left connection part 400a provided at an upper part of the lower part chassis 400.

Furthermore, in the folding type portable phone 100 shown in FIG. 12, the entire right connection part 400b is made of non-conductive material. However, as long as there is no continuity at the side of the right hinge 103b, the present invention is not limited to the above.

For example, the above mentioned metal material may be vapor-deposited on the synthetic resin in a state where only a surface 161 is masked so as to make the lower part chassis 400. As a result of this, only the surface where the right connection part 400b provided at an upper part of the lower part chassis 400 comes in contact with the right connection part 300b provided at a lower part of the upper part chassis 300, is made of non-conductive material.

Furthermore, a non-conductive washer member or the like may be put between the right connection part 300b provided at a lower part of the upper part chassis 300 and the right connection part 400b provided at an upper part of the lower part chassis 400.

In addition, the antenna 150 is provided at a non-conductive side which is the side of the right connection part 400b and inside of the lower part housing 112 in a state where the antenna 150 can be extended and retracted.

Thus, in the folding type portable phone 100 of the present invention, the upper part chassis 300 of the operation key part 101 is mechanically connected to the lower part chassis 400 of the liquid crystal display part 102 via the left hinge mechanism part 180 and the right hinge mechanism part 190. However, there is electric continuity only at the left hinge mechanism 180 between the upper part chassis 300 and the lower part chassis 400. The antenna 150 is positioned on the non-electric continuity side, namely the side of the right hinge mechanism part 190.

The antenna 150 is electrically connected to an electric power supply circuit of the first printed board module 117 via the designated electric power supply surface (a surface positioned at a part indicated by a dotted line in FIG. 12, for example) of the back surface of the first printed board module 117.

Now, a relationship between the above mentioned structure and the above mentioned gamma matching is described.

Figure 13:
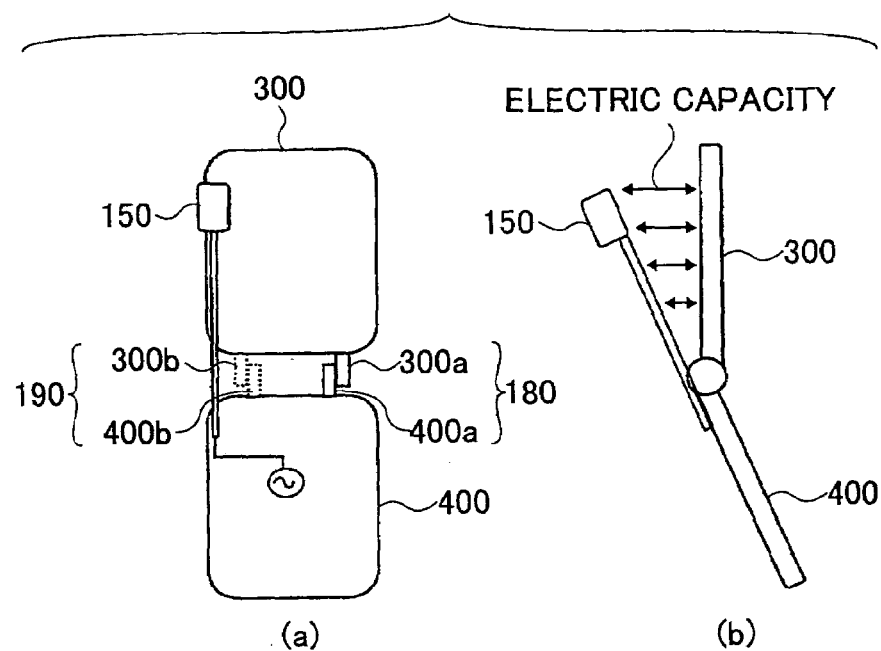
FIG. 13 provides schematic views of an upper part chassis 300 and a lower part chassis 400 in a case where the folding type portable phone 100 shown in FIG. 4

FIG. 13 is a schematic view of the upper part chassis 300 and the lower part chassis 400 in a case where the folding type portable phone 100 shown in FIG. 4 and FIG. 12 is unfolded. More particularly, FIG. 13-(a) is a view seen in the X-Y plane of FIG. 4-(a), and FIG. 13-(b) is a view seen in the Y-Z plane of FIG. 4-(a).

In FIG. 13-(a), the connection part 300b provided at a lower part of the upper part chassis 300 and the right connection part 400b provided at an upper part of the lower part chassis 400 are indicated by dotted lines just to show that a side of the right hinge mechanism part 190 in FIG. 12 has no electric continuity. Furthermore, arrows in FIG. 13-(b) indicates the electric capacity.

Referring to FIG. 13, the folding type portable phone 100 is unfolded and the antenna 150 is extended for communicating or telephone calling, so that an electric capacity is formed between the antenna 150 which is conductive and the upper part chassis 300 or the second printed board module 157 which is conductive.

There is no electric continuity at the side of the right hinge mechanism part 190, namely between the right connection part 300b provided at a lower part of the upper part chassis 300 and the right connection part 400b provided at an upper part of the lower part chassis 400. Hence, an electric notch, namely an electric cutout is formed between the upper part chassis 300 and the lower part chassis 400. Accordingly, the electric state shown in FIG. 13 can be redrawn to FIG. 14.

Figure 14:
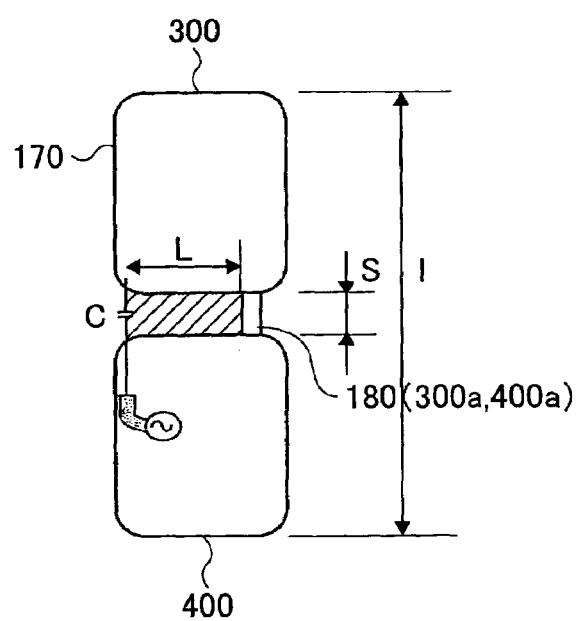
FIG. 14 is a modified schematic view of FIG. 13 and is an equivalent view to FIG. 13.

In FIG. 14, a condenser "C" represents an electric capacity formed between the antenna 150 which is conductive and the upper part chassis 300 which is conductive. A part indicated by diagonal lines represents the above mentioned electric notch.

The electric state of the folding type portable phone 100 shown in FIG. 14 is equivalent to the gamma matching circuit shown in FIG. 8. As shown in FIG. 4-(b), a full length "1" of the folding type portable phone 100 is suitable for a length of approximately $\lambda/2$ of the using frequency. The impedance matching can be achieved at a using frequency band by adjusting the capacity of the condenser C shown in FIG. 14, the length L between a right end part 170 of the upper part chassis 300 and the left hinge mechanism part 180, and the length S of the left connection part 300a provided at the lower part of the upper pact chassis 300 and the left connection part 400a provided at the upper part of the lower pact chassis 400, which are connected by the left hinge 103a.

The inventors of this application paid attention to electric continuity and non-electric continuity of the side of the left hinge mechanism part 180 (the left connection part 300a provided at the lower part of the upper pact chassis 300 and the left connection part 400a provided at the upper part of the lower pact chassis 400) and the side of the right hinge mechanism part 190 (the right connection part 300b provided at the lower part of the upper pact chassis 300 and the right connection part 400b provided at the upper part of the lower pact chassis 400), and measured radiation efficiency of the antenna 150. A table 2 shows the results of the measurements. In the table 2, a value of the radiation efficiency [dB] shows a characteristic in a case where a $\lambda/2$ dipole antenna is 0 (zero) [dB].

TABLE 2

RADIATION EFFICINCY [dB]

| MEASUREMENT CONDITION | | FREAQUENCY | |
| --- | --- | --- | --- |
| A SIDE OF LEFT MECHANISM 180 | A SIDE OF RIGHT MECHANISM 190 | 819 [MHz] | 949 [MHz] |
| CONTINUITY | CONTINUITY | −8.5 | −7.0 |
| NON-CONTINUITY | NON-CONTINUITY | −6.6 | −7.9 |
| CONTINUITY | NON-CONTINUITY | −0.0 | −1.3 |

As shown in table 2, in a case where the right connection part 400b was formed without vapor-depositing a metal material so that there was no electric continuity between the right connection part 300b and the right connection part 400b but there was an electric continuity between the left connection part 300a and the left connection part 400a, −0.0 [dB] of the radiation efficiency for a frequency in a state of 819 [MHz] and −1.3 [dB] of the radiation efficiency for a frequency of 949 [MHz] were obtained. Therefore, under the above mentioned conditions, better radiation efficiency can be obtained than in a case where both sides of the left hinge mechanism part 180 and the right hinge mechanism part 190 have electric continuity or both sides do not have electric continuity.

That is, under the above mentioned structure of the folding type portable phone 100, the antenna 150 provided in the lower part housing 112, the lower part chassis 400, the left hinge mechanism part 180 (the left connection part 300a, the left connection part 400a, and the left hinge 103a), and the upper part chassis 300 that functions as an obstacle of the antenna conventionally, function in a body, as a $\lambda/2$ antenna having good radiation efficiency.

Furthermore, in the above mentioned embodiment, the lower part chassis 400 can be formed without vapor-depositing metal material on the right connection part 400b. Hence, it is possible to manufacture the above mentioned lower part chassis 400 easily.

In a case where the folding type portable phone 100 is folded, since the upper part chassis 300 is not positioned where it works as an obstacle to the antenna 150, good radiation characteristics can be obtained.

Thus, according to the folding type portable phone 100 of the first embodiment of the present invention, in a case where the folding type portable phone is unfolded and the antenna is extended so as to conduct phone calling and communications, it is possible to transmit and receive a radio wave efficiently and realize high quality phone calling and communicating.

Although there is no electric continuity between the right connection part 300b and the right connection part 400b in the above mentioned embodiment, the present invention is not limited to the above. That is, it is possible to manufacture a the folding type portable phone which functions as a $\lambda/2$ dipole antenna that can obtain effective high gain at a using frequency band, wherein by adjusting the capacity of the condenser "C", the length "L", and the length "S" for gamma matching as shown in FIG. 8, impedance matching can be achieved.

For example, in the above mentioned example, the full length of the folding type portable phone 100, namely the length "l" shown in FIG. 4-(b) is set so as to have a length of approximately $\lambda/2$ of the using frequency. However, the sum of the full length of the second printed board module 157 and the full length of the first printed board module 117 may be suitable for approximately $\lambda/2$ of the using frequency.

Second Embodiment

Next, a second embodiment of the present invention will be explained. In drawings for the second embodiment of the present invention, parts that are the same as the parts shown in drawings for the first embodiment are given the same reference numerals, and explanation thereof will be omitted.

Figure 15:
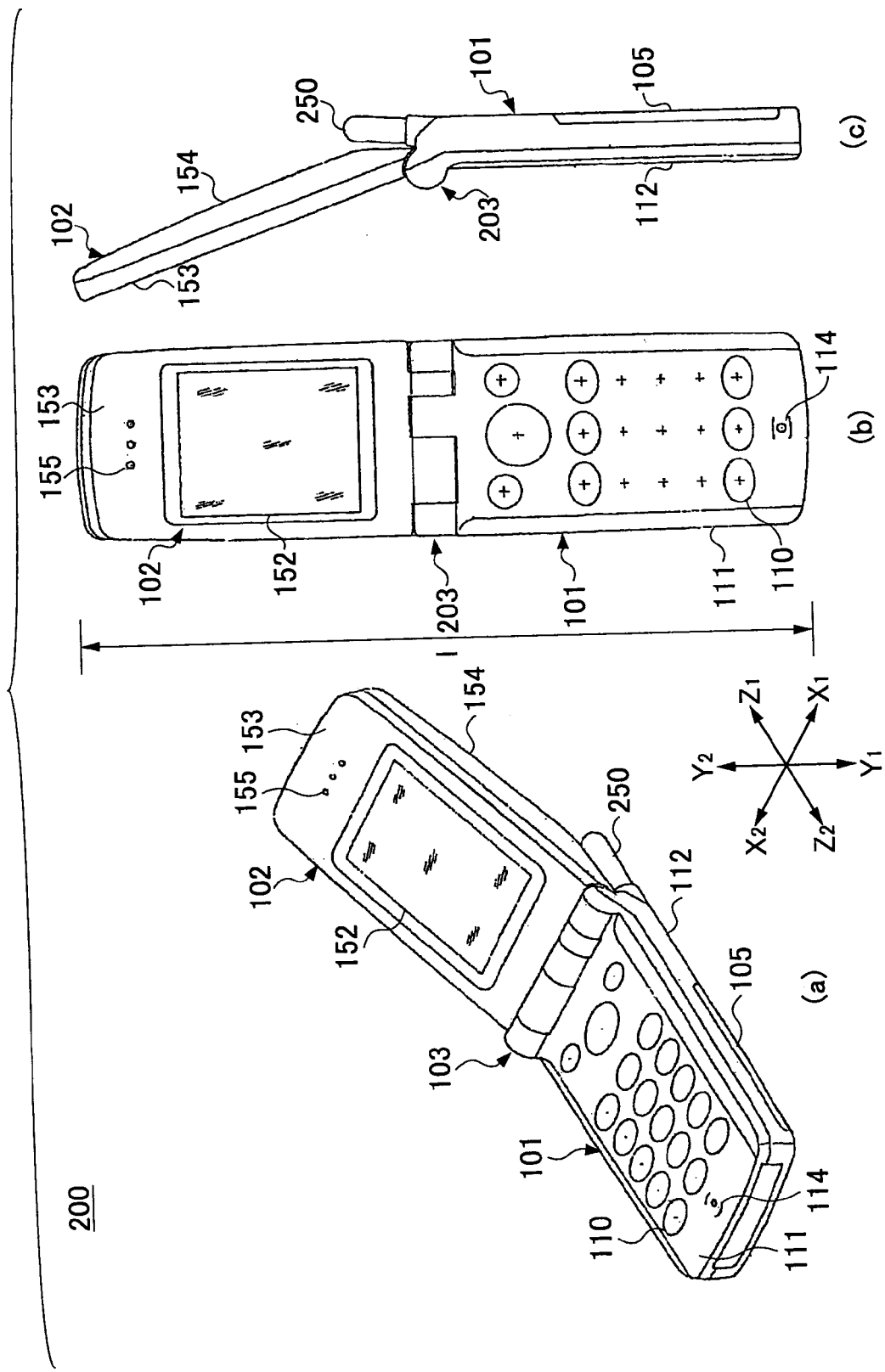
FIG. 15 provides schematic views of a folding type portable phone 200 of a second embodiment of the present invention in a case where the folding type portable phone 200 is unfolded.
Figure 16:
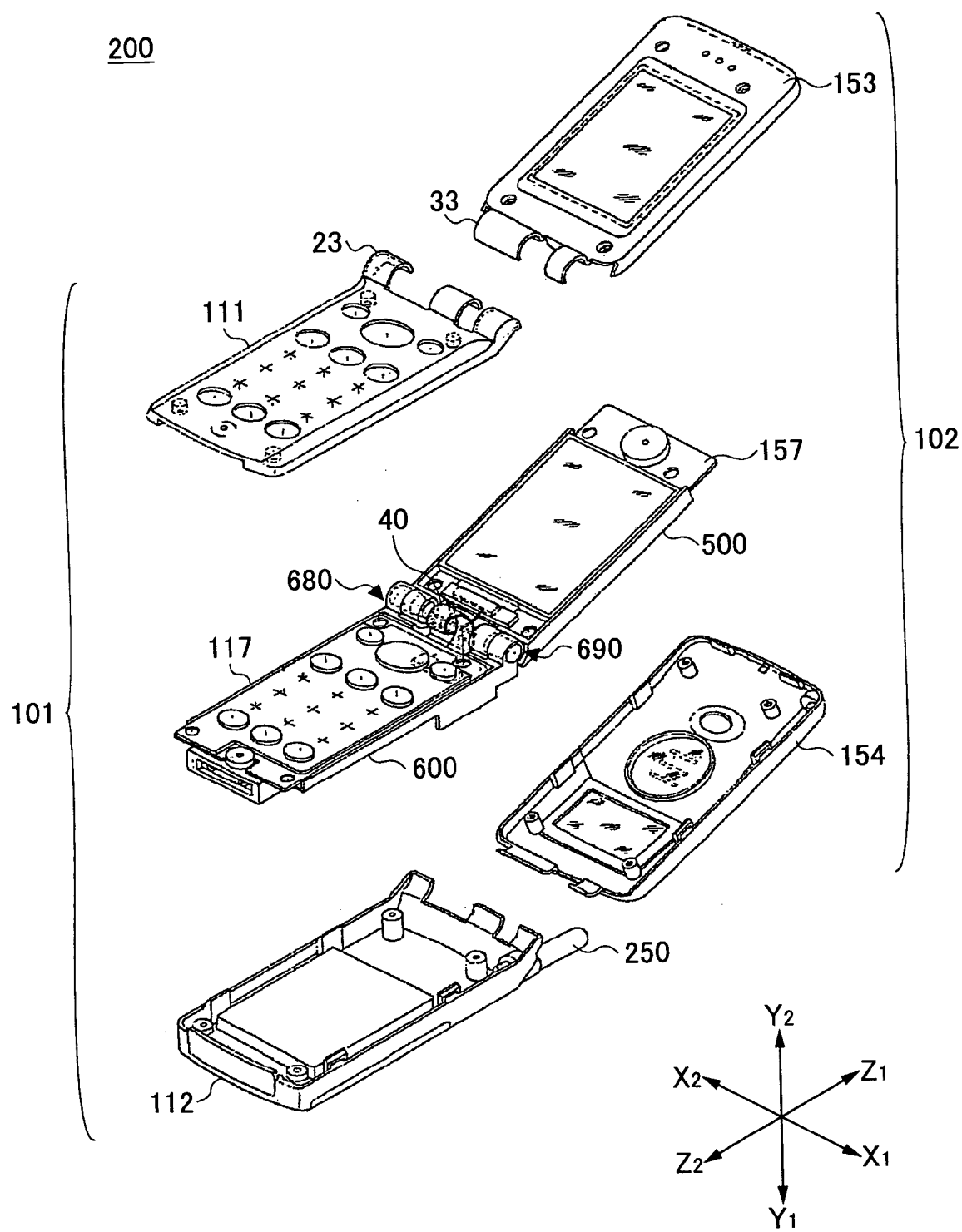
FIG. 16 is an exploded perspective view of the folding type portable phone 200 shown in FIG. 15.

FIG. 15 provides views of a folding type portable phone 200 of a second embodiment of the present invention in a case where the folding type portable phone 200 is unfolded. More particularly, FIG. 15-(a) is a perspective view of the folding type portable phone 200, FIG. 15-(b) is a plan view of the folding type portable phone 200, and FIG. 15-(c) is a side view of the folding type portable phone 200. FIG. 16 is an exploded perspective view of the folding type portable phone 200 shown in FIG. 15.

Referring to FIG. 15, the folding type portable phone 200 of the second embodiment of the present invention, as well as the folding type portable phone 100 of the first embodiment of the present invention, includes an operation key part 101, a liquid crystal display part 102, a connection part 103 for connecting the operation key part 101 and the liquid crystal display part 102, and others.

Referring to FIG. 16, the operation key part 101 is formed by combining an input key board 111 and a lower part housing 112 functioning as a second housing. A lower part chassis 600 functioning as a second chassis is provided inside of the lower part housing 112. A first printed board module 117 is provided at the lower part chassis 600.

The liquid crystal display part 102 is formed by combining the liquid crystal display board 153 and the upper part housing 154 functioning as a first housing. An upper part chassis 500 functioning as a first chassis is provided inside of the upper part housing 154. The liquid crystal display 152 and the second printed board module 157 are provided at the upper part chassis 500.

The upper part chassis 500 and the lower part chassis 600 include the left hinge mechanism part 680 and the right hinge mechanism part 690.

The left hinge mechanism part 680 is covered with an arc part 23 projecting from an edge of the input key board part 111 of the dial operations key side part 101. The right hinge mechanism part 690 is covered with an arc part 33 projecting from an edge of the liquid crystal display board 153 of the liquid crystal side part 102. The left hinge mechanism part 680 and the right hinge mechanism part 690 form the connection part 103 shown in FIG. 15. Details of structures of the left hinge mechanism part 680 and the right hinge mechanism part 690 will be described below.

Furthermore, the first printed board module 117 of the dial operations key side part 101 and the second printed board module 157 of the liquid crystal side part 102 are connected by a flexible printed board 40. The flexible printed board 40 is put between the left hinge mechanism part 680 and the right hinge mechanism part 690 and is connected to the first printed board module 117 and the second printed board module 157 via connectors. The flexible printed board 40 is bendable and flexible so as to form a curl configuration at a designated position thereof.

In addition, an external antenna 250 for sending and receiving is installed at the right side of the inside of the lower part housing 112. The external antenna 250 is fixed there without being flexible, unlike the whip antenna 150 of the folding type portable phone 100 of the first embodiment of the present invention.

Referring back to FIG. 15, when the folding type portable mobile phone 200 is carried, namely at the time of waiting for a telephone calling or not communicating, the liquid crystal display part 102 is folded to the operation key part 101. When the communicating or telephone calling is initiated, the operation key part 101 is held by a hand of the user and the liquid crystal display part 102 is rotated at the connection part 103 as a center by manual effort so that the folding type portable mobile phone 200 is unfolded.

The full length of the folding type portable phone 200 (the length in the longitudinal direction of the folding type portable phone 200), namely a length "l" shown in FIG. 15-(b), is set so as to be suitable for approximately half of the wave length $\lambda_1$ of the first using frequency.

According to the first embodiment of the present invention as shown in FIG. 4, FIG. 13 and others, the full length of the folding type portable phone 100 is approximately half of the wave length of the using frequency, there is electric continuity at the left hinge mechanism part 180, and the antenna 150 is positioned at a side of the right hinge mechanism part 190 where there is no electric continuity, so that impedance matching can be obtained by using the above mentioned gamma matching.

In the second embodiment of the present invention, the impedance matching at the first using frequency is achieved by using the above mentioned gamma matching, and the impedance matching at the second using frequency is achieved by using the relationship between the notch antenna and resonance frequency. First principles of the second embodiment are next described and then detailed structures thereof are described.

Figure 17:
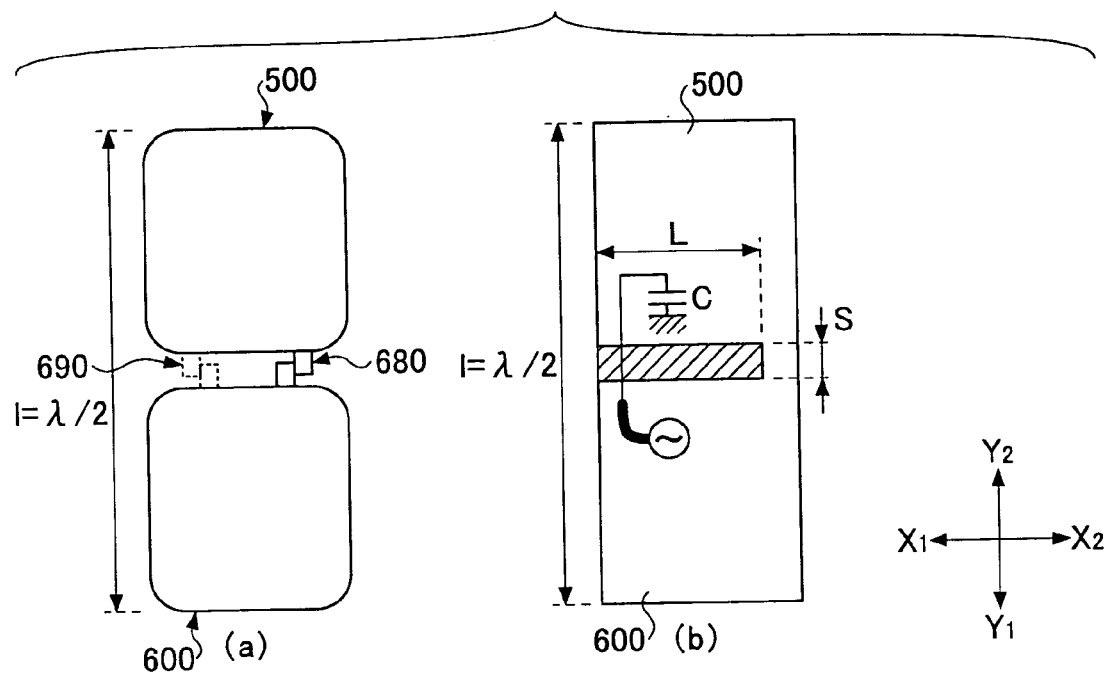
FIG. 17 provides schematic views for explaining a principle of the folding type portable phone 200 of a second embodiment of the present invention.

FIG. 17 is a view for explaining a principle of the folding type portable phone 200 of the second embodiment of the present invention. More particularly, FIG. 17-(a) is a view seen in the X-Y plane of FIG. 15-(a) and shows a state of the upper part chassis 500 and the lower part chassis 500 shown in FIG. 16 when the folding type portable phone 200 is unfolded. In FIG. 17-(a), a part 680 indicated by solid lines represents a part where there is an electric continuity, and a part 690 indicated by dotted lines represents a part mechanically connected but where there is no electric continuity. FIG. 17-(b) is a view electrically equivalent to the view of FIG. 17-(a).

In the folding type portable phone 200 of the second embodiment of the present invention, a length "l" shown in FIG. 15-(b) is set so as to be suitable for half of the wave length $\lambda_1$ of the first using frequency. As shown in FIG. 17-(a), although there is no electric continuity at the right hinge mechanism part 690, there is electric continuity at parts including the left hinge mechanism part 680 other than the right hinge mechanism part 690.

Therefore, an electric notch namely electric cutout is formed between the upper part chassis 500 and the lower part chassis 600 as shown by diagonal lines in FIG. 17-(b). An electric state shown in FIG. 17-(b) is equivalent to a state shown in FIG. 8 that is a modification of the gamma matching shown in FIG. 5 and FIG. 7.

The impedance matching can be achieved at the first using frequency by the above mentioned gamma matching, in a state where a full length "l" of the folding type portable phone 200 is suitable for a length of an approximately one half of the wavelength ($\lambda/2$) of the first using frequency, the capacity of the condenser C is adjusted based on change of multiplier by a known method, the length L in the X1-X2 direction of the electric notch is adjusted, and the length S in the Y1-Y2 direction of the electric notch is adjusted. Here, the length L is a length in the X1-X2 direction is a length in X1-X2 direction between ends of the upper part chassis 500 and the lower part chassis 600 at a side where the electric notch is formed and the left hinge mechanism part 680 that has electric continuity.

Because of the above mentioned adjustment, the upper part chassis 500, the lower part chassis 600, and the left hinge mechanism part 680 function in a body, as an antenna having a length of approximately half of a wave length $\lambda_1$ of the first using frequency and a good electric continuity.

Meanwhile, the inventors of this application paid attention to a relationship between the so-called notch antenna, having an electric notch shown by diagonal lines in FIG. 17, and a resonance frequency so that impedance matching at the second using frequency can be obtained according to the second embodiment.

Figure 18:
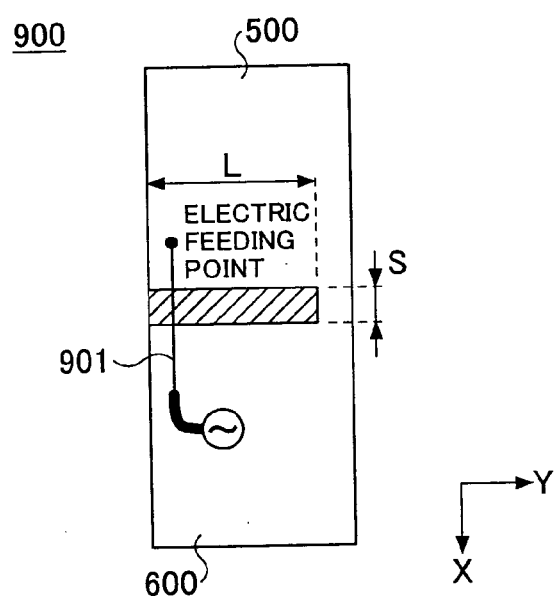
FIG. 18 is a schematic view for explaining a relationship between a notch antenna and a resonance frequency.
Figure 19:
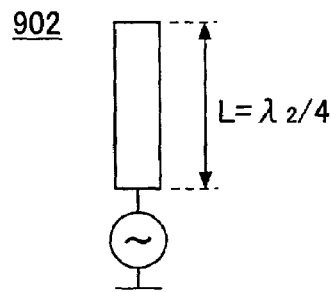
FIG. 19 is a schematic view electrically equivalent to FIG. 18 in a case where Ex mode is applied to a notch antenna 900 shown in FIG. 18.

FIG. 18 is a view for explaining a relationship between a notch antenna and a resonance frequency. FIG. 19 is a view electrically equivalent to FIG. 18 in a case where Ex mode is applied to a notch antenna 900 shown in FIG. 18. In FIG. 18, the electric notch is indicated by diagonal lines as well as FIG. 17-(b).

Referring to FIG. 18, in a notch antenna 900 having an electric notch inside thereof, "S" represents a length in an x direction of the electric notch, "L" represents a length in a y direction of the electric notch, and "$\lambda_2$" represents a wavelength at a frequency when the notch antenna is used. Under the above mentioned circumstances, resonance occurs in two state, namely "Ex mode" wherein "L" is longer than "S" and L equals $\lambda_2/4$ and "Ey mode" wherein "S" is longer than "L" and S equals $\lambda_2/4$.

However, in a case of the Ey mode, it is necessary to provide a long coaxial cable for feeding electric power to the notch antenna. Hence, it may not be desirable to apply the Ey mode to a folding type portable phone.

Because of this, the inventors of this application decided to apply the Ex mode to the folding type portable phone so that the length of the coaxial cable 901 can be minimized. In a case where the Ex mode is applied to the folding type portable phone, the notch antenna 900 shown in FIG. 18 is electrically equivalent to the monopole antenna shown in FIG. 19 and having a full length of $\lambda_2/4$.

Thus, it is possible to obtain impedance matching at the second using frequency by setting "L" that is a length in the y direction of the electric notch shown in FIG. 18 as a length suitable for $\lambda_2/4$ of the second using frequency and adjusting the capacity of the condenser "C" shown in FIG. 17-(b).

Meanwhile, when waiting for telephone calling and the folding type portable phone is being carried, the phone is folded. Therefore, even in a state where the folding type portable phone is folded, it is necessary for the folding type portable phone to have a structure wherein resonance occurs at the first and second using frequencies.

Figure 20:
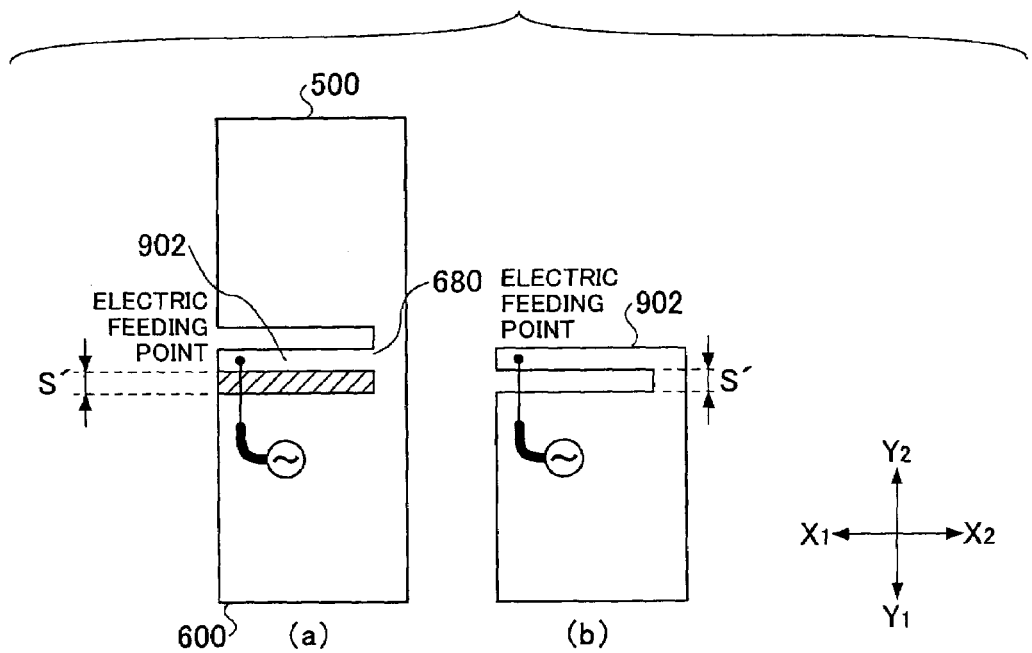
FIG. 20 provides schematic views showing an electric state in a case where a conductor is provided between a left hinge mechanism part 680 and a right hinge mechanism part 690 shown in FIG. 17.

More particularly, even in the state where the folding type portable phone is folded, the folding type portable phone should have a structure wherein the above mentioned electric notch is formed. Therefore, the inventors of this application realized that a conductor needs to be provided between the left hinge mechanism part 680 and the right hinge mechanism part 690 shown in FIG. 17. An electrically equivalent state to the above mentioned state is shown in FIG. 20. Here, the electric notch is shown by diagonal lines in FIG. 20. More particularly, FIG. 20-(a) shows a case where the folding type portable phone is unfolded and FIG. 20-(b) shows a case where the folding type portable phone is folded.

Referring to FIG. 20, a conductive member 902 is provided in an X1 direction from the left hinge mechanism part 680, namely at a side of the right hinge mechanism part 690. Furthermore, although the feeding point of an electric power supply is provided at the upper part chassis 500 in the example shown in FIG. 18, here the feeding point of an electric power supply is provided at the conductive member 902. Therefore, as shown by diagonal lines in FIG. 20, the electric notch having a width "S" in the Y1-Y2 direction is formed between the conductive member 902 and the lower part chassis 600.

Opening and closing of the upper part chassis 500 and the lower part chassis 600 are achieved by the left hinge mechanism part 680 and the right hinge mechanism part 690 as a center of opening and closing. Because of this structure, as shown in FIG. 20-(b), even if the upper part chassis 500 is closed against the lower part chassis 600, the electric notch is formed between the conductive member 902 and the lower part chassis 600.

Thus, regardless of folding or unfolding of the folding type portable phone 200, the electric notch can be formed, and thereby it is possible to achieve resonance at a designated second using frequency.

Furthermore, as shown in FIG. 15, the full length of the folding type portable phone 200 is set as being suitable for approximately half of the wave length $\lambda_1$ of the first using frequency. When the folding type portable phone 200 is folded, the full length of the folding type portable phone 200 is approximately one fourth of the wave length $\lambda_1$ of the first using frequency, as shown in FIG. 21.

Figure 21:
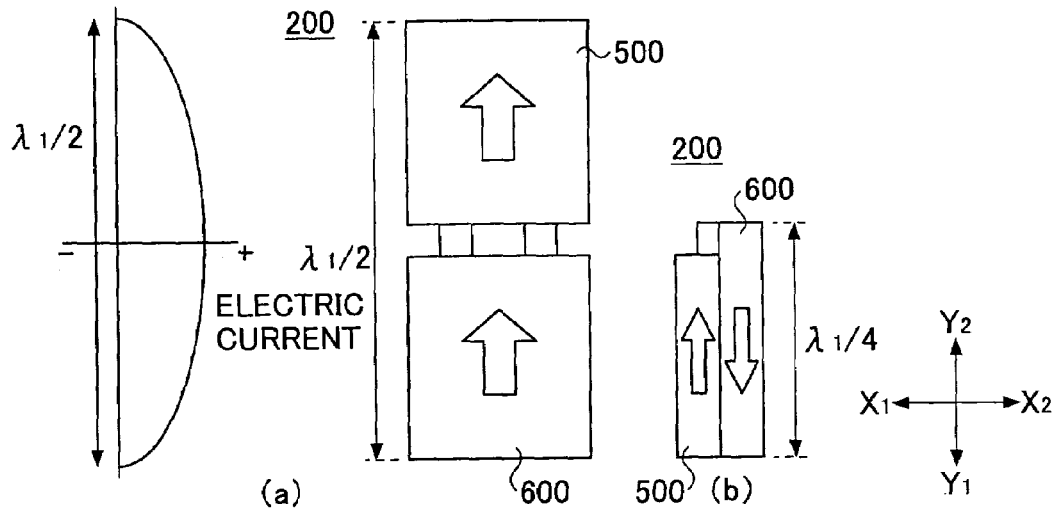
FIG. 21 is a schematic view of a state where the folding type portable phone 200 is unfolded.

More particularly, FIG. 21-(a) shows a state where the folding type portable phone 200 is unfolded and FIG. 21-(b) shows a state where the folding type portable phone 200 is folded. In FIG. 21, an arrow represents the direction of electric current for the folding type portable phone 200.

Furthermore, the drawing to the left of FIG. 21-(a) indicates an electric current distribution in a state where the folding type portable phone 200 is unfolded. The vertical axis represents a position in a full length direction of the folding type portable phone 200. The horizontal axis represents the amount of electric current. The upper half of the electric current distribution indicates electricity distribution at the upper part chassis 500 and the lower half of the electric current distribution indicates electricity distribution at the lower part chassis 600.

As shown in FIG. 21, under the structure shown in FIG. 17, when the folding type portable phone 200 is folded, the direction of the electric current at the upper part chassis 500 is reverse to the direction of the electric current at the lower part chassis 600 so that the electric currents at the upper part and lower part chassis 500 and 600 contradicts each other. That may cause the collapse of a resonant state at the first using frequency.

Figure 22:
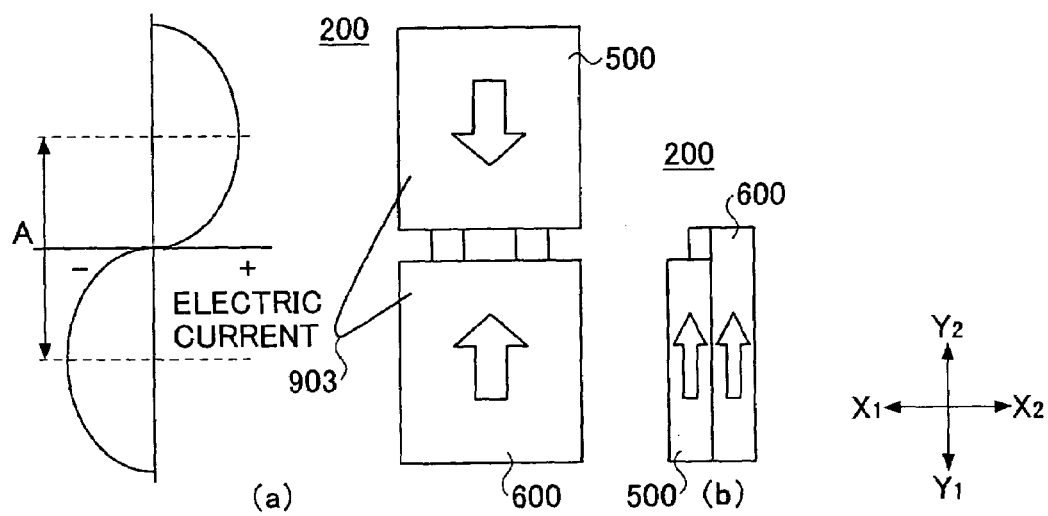
FIG. 22 is a schematic view of the folding type portable phone 200 in a case where an upper part chassis 500 and a lower part chassis 600 are connected to each other by a coaxial cable 903.

Accordingly, as shown in FIG. 22, the upper part chassis 500 and the lower part chassis 600 are connected by a coaxial cable 903 having a full length suitable for approximately half of the wave length $\lambda_1$ of the first using frequency.

FIG. 22-(a) shows a state where the folding type portable phone 200 is unfolded and FIG. 22-(b) shows a state where the folding type portable phone 200 is folded. In FIG. 22, an arrow represents the direction of electric current in the folding type portable phone 200.

Furthermore, the drawing to the left of FIG. 22 indicates an electric current distribution in a state where the folding type portable phone 200 is unfolded. The vertical axis represents a position in a full length direction of the folding type portable phone 200. The horizontal axis represents the amount of electric current. A part indicated by an arrow "A" of the electricity distribution is suitable for the coaxial cable 903.

As shown in FIG. 22, since the upper part chassis 500 and the lower part chassis 600 are connected by a coaxial cable 903 having a full length suitable for approximately half of the wave length $\lambda_1$ of the first using frequency, even if the folding type portable phone 200 is folded, the direction of the electric current at the upper part chassis 500 is same as the direction of the electric current at the lower part chassis 600.

That is, by connecting the upper part chassis 500 and the lower part chassis 600 with the coaxial cable 903, even if the folding type portable phone 200 is folded, the gamma matching of the folding type portable phone, whose full length is suitable for approximately half of the wave length $\lambda_1$ of the first using frequency, can be used, as well as in the state where the folding type portable phone 200 is unfolded.

Therefore, even if the folding type portable phone 200 is folded, it is possible to prevent contradiction of the directions of the electric currents at the upper and lower parts chassis 500 and 600 shown in FIG. 21 so that it is possible for resonance to occur at the first using frequency. As described above, since resonance of the second using frequency is caused by the length "L" in the y direction of the electric notch in FIG. 17, it is possible to obtain resonance of the second using frequency regardless of states of folding and unfolding of the folding type portable phone 200.

Next, a detailed structure of the folding type portable phone 200 of the second embodiment of the present invention is described. In the folding type portable phone 200, based on the above mentioned principle, it is possible to obtain impedance matching at the first using frequency by using gamma matching, and obtain impedance matching at the second using frequency by using the relationship between the notch antenna and the resonant frequency.

Figure 23:
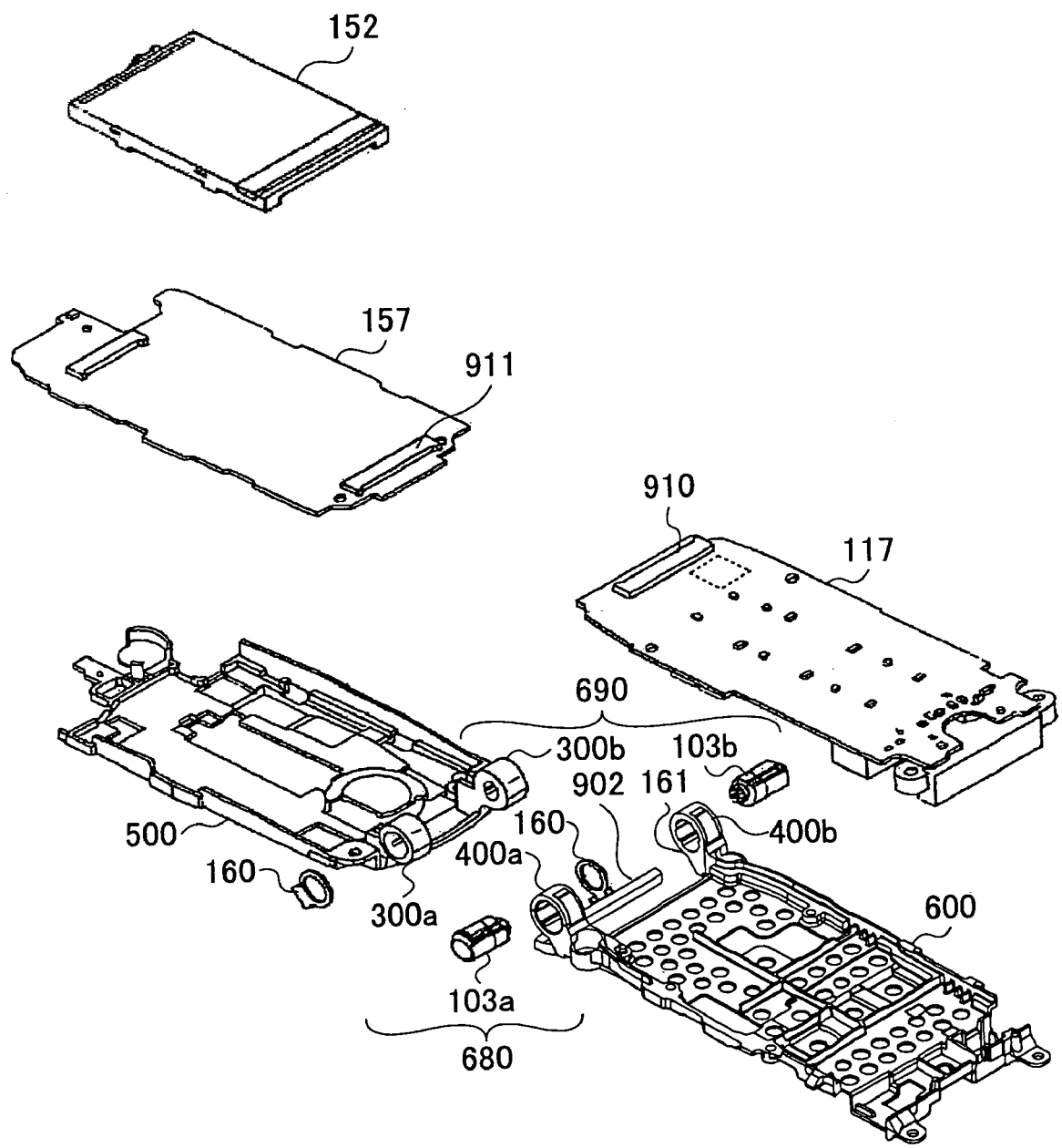
FIG. 23 is an exploded perspective view of the upper part chassis 500 and the lower part chassis 600 of the folding type portable phone 200 of the second embodiment of the present invention.

FIG. 23 is an exploded perspective view of the upper part chassis 500 and the lower part chassis 600 of the folding type portable phone 200 of the second embodiment of the present invention.

Referring to FIG. 23, the liquid crystal display 152 and the second printed board module 157 are provided at the upper part chassis 500 shown in FIG. 16. The first printed board module 117 is provided at the lower part chassis 600.

The upper part chassis 500 is made of metal such as aluminum, nickel, or the like, or by vapor-depositing metal material such as aluminum, nickel, magnesium or the like on synthetic resin. The upper part chassis 500 and an earth conductive pattern of the second printed board module 157 are electrically connected to each other via a spring member or the like.

The upper part chassis 500 is rotatably connected to the lower part chassis 600 via the left hinge mechanism part 680 and the right hinge mechanism part 690.

The left hinge mechanism part 680 includes a left hinge 103a, a left connection part 300a functioning as a first connection part and provided at a lower part of the upper part chassis 500, and a left connection part 400a functioning as a second connection part and provided at an upper part of the lower part chassis 600. Similarly, the right hinge mechanism part 690 includes a right hinge 103b, a right connection part 300b provided at a lower part of the upper part chassis 500, and a right connection part 400b provided at an upper part of the lower part chassis 600.

The left connection parts 300a and 400a have hollow configurations so that the left hinge 103a can be inserted. Similarly, the right connection parts 300b and 400b have hollow configurations so that the right hinge 103b can be inserted.

The lower part chassis 600 is made of metal such as aluminum, nickel, or the like, or by vapor-depositing metal material such as aluminum, nickel, magnesium or the like on synthetic resin.

The right connection part 400b provided at an upper part of the lower part chassis 400 is made of non-conductive material such as synthetic resin on which metal material is not vapor-deposited. For example, the lower part chassis 600 is formed by vapor-depositing the above mentioned metal material on the synthetic resin in a state where the right connection part 400b is masked. Therefore, it is possible to easily form the lower part chassis 600 having the above mentioned right connection part 400b.

The upper part chassis 500 and the lower part chassis 600 are connected to each other by the left hinge mechanism part 680 and the right hinge mechanism part 690. There is electric continuity between the left connection parts 300a and 400a where the left hinge 103a is inserted. There is no electric continuity between the right connection parts 300b and 400b where the right hinge 103a is inserted.

In order to have more reliable continuity at a side of the left hinge mechanism part 680, a connection fitting 160 having a hollow configuration may be put between the left connection part 300a provided at a lower part of the upper part chassis 500 and the left connection part 400a provided at an upper part of the lower part chassis 600.

Under the above structure, the upper part chassis 500 and the lower part chassis 600 are physically connected to each other by the left hinge mechanism part 680 functioning as a first connection part and the right hinge mechanism part 690 functioning as a second connection part. But, there is electric continuity at only the left hinge mechanism part 680 between the upper part chassis 500 and the lower part chassis 600. Therefore, the electric notch described with reference to FIG. 17 through FIG. 19 is formed between the left hinge mechanism part 680 and the right hinge mechanism part 690. Hence, a notch antenna is formed by the upper part chassis 500, the lower part chassis 600, and the left hinge mechanism part 680.

More particularly, a length in the Z1-Z2 direction in FIG. 23 between the left hinge mechanism part 680 which provides electric continuity between the upper part chassis 500 and the lower part chassis 600 and the right hinge mechanism part 690 which does not provide electric continuity between the upper part chassis 500 and the lower part chassis 600, is set to be suitable for a length "L" described with reference to FIG. 17 through FIG. 19, namely approximately one fourth of the wave length $\lambda_2$ of the second using frequency.

Furthermore, as described above, the full length of the folding type portable phone 200 (a length in a vertical direction of the folding type portable phone 200), namely the length "1" shown in FIG. 15-(b), is set to be suitable for approximately half of the wave length $\lambda_1$ of the first using frequency.

Therefore, in a state where the folding type portable phone 200 is unfolded, the impedance matching at the first using frequency can be achieved with gamma matching by properly adjusting the capacity of the condenser provided inside of the folding type portable phone 200. And also, the impedance matching at the second using frequency can be achieved by using the relationship between the notch antenna and the resonant frequency.

In the above embodiment, the entire right connection part 400b provided at an upper part of the lower part chassis 600 is formed by a non-conductive material. However, the present invention is not limited to the above as long as the side of the right hinge mechanism part 690 does not provide electric continuity.

For example, the lower part chassis 600 may be formed by vapor-depositing the above mentioned metal material on the synthetic resin in a state where the surface 161 where the right connection part 400b provided at the upper part of the lower part chassis 600 comes in contact with the right connection part 300b provided at the lower part of the upper part chassis 500 is masked, so that only the surface 161 may be formed by non-conductive material.

Furthermore, a non-conductive washer member or the like may be put between the right connection part 300b provided at the lower part of the upper part chassis 500 and the right connection part 400b provided at the upper part of the lower part chassis 600.

Furthermore, in the above mentioned embodiment, the full length of the folding type portable phone 200, namely the length "l" shown in FIG. 15-(b) is set to be suitable for approximately half of the wave length $\lambda_1$ of the first using frequency. However, the present invention is not limited to the above. For example, a sum of the full length of the second printed board module 157 and the full length of the first printed board module 117 may be suitable for approximately $\lambda_1/2$ of the first using frequency.

Figure 24:
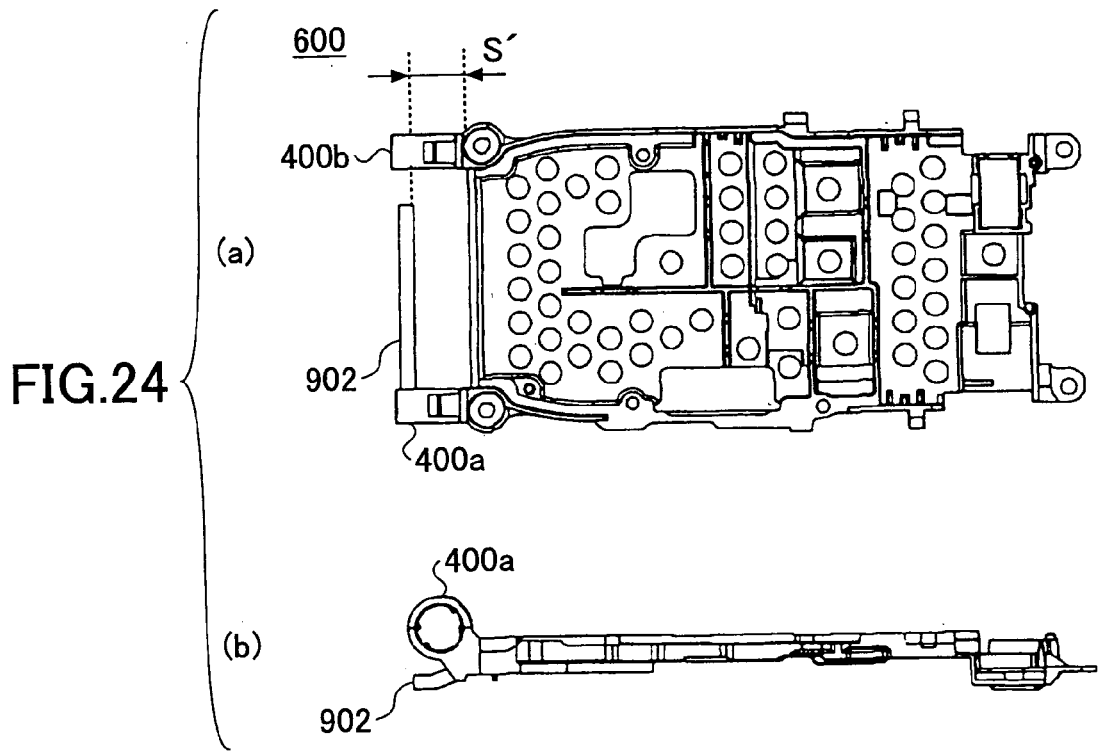
FIG. 24 is a schematic view showing the lower part chassis 600 shown in FIG. 23.

Meanwhile, FIG. 24 is a view showing the lower part chassis 600 shown in FIG. 23. More particularly, FIG. 24-(a) is a plan view thereof and FIG. 24-(b) is a side view thereof in Z2-Z1 direction.

As shown in FIG. 23 and FIG. 24, at the left connection part 400a provided at an upper part of the lower part chassis 600, a conductive member 902 is extended from a part positioned lower than a hollow part of the left connection part 400a in the Z1 direction, namely to a side of the right hinge mechanism part 690, so as to form a length "S'" between the lower part chassis 600 and the conductive member 902 and not to reach the right connection part 400b.

Opening and closing of the upper part chassis 500 and the lower part chassis 600 are conducted in a state where the left hinge mechanism part 680 and the right hinge mechanism part 690 are centers of the operations of opening and closing. Because of the conductive material 902, even when the upper part chassis 500 is closed against the lower part chassis 600, an electric notch is formed so as to have a length "S'" between the conductive member 902 and the lower part chassis 600.

That is, regardless of folding and unfolding states of the folding type portable phone 200, the electric notch can be formed so that resonance at the second using frequency can be achieved.

Meanwhile, as described above with reference to FIG. 15, the first printed board module 117 provided at the upper chassis 500 and the second printed board module 157 provided at the lower part chassis 600 are electrically connected by a flexible printed board 40. The flexible printed board 40 is bendable and flexible so as to form a curl configuration at a designated position thereof.

Figure 25:
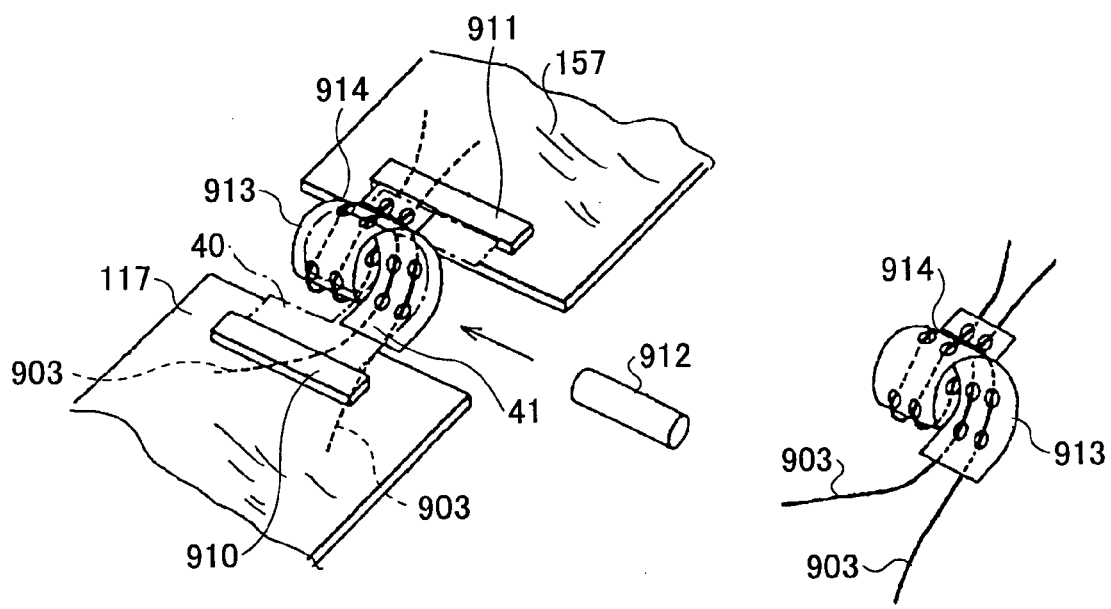
FIG. 25 is an exploded perspective view showing a first structure of a flexible printed board 40 and the vicinity thereof.
Figure 26:
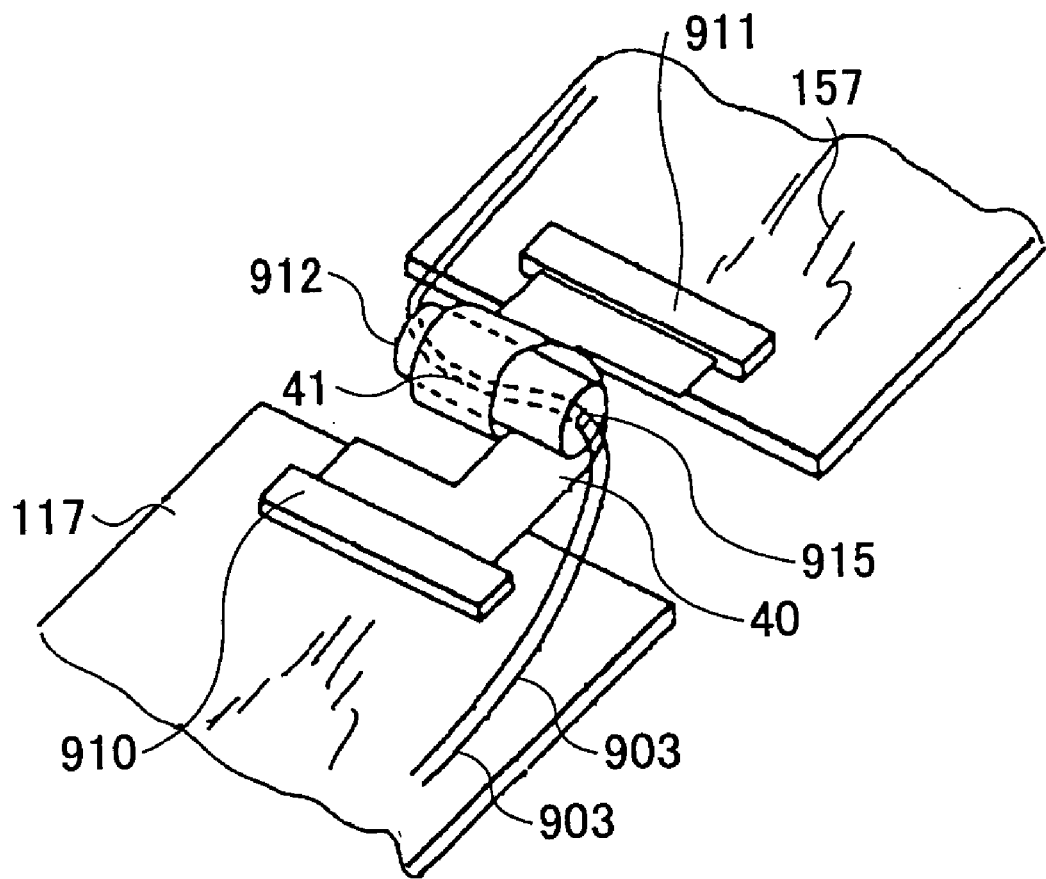
FIG. 26 is a perspective view showing a second structure of the flexible printed board 40 and the vicinity thereof.

FIG. 25 is a perspective view showing a first structure of a flexible printed board 40 and the vicinity thereof. FIG. 26 is a perspective view showing a second structure of the flexible printed board 40 and the vicinity thereof.

Referring to FIG. 25, a connector 910 for connecting to the first printed board module 117 provided at the upper chassis 500 is provided at one end of the flexible printed board 40 shown by a one point dotted line. In addition, a connector 911 for connecting to the second printed board module 157 provided at the lower chassis 600 is provided at the other end of the flexible printed board 40. When the flexible printed board 40 is connected to the printed board modules 117 and 157 via the connectors 910 and 911, a curl part 41 is formed so as to form at least one spiral.

An axial member 912 is inserted in an axial direction inside of the curl part 41 formed at the flexible printed board 40 so that the curl part 41 is prevented from being deformed due to long term repeated operations of folding and unfolding the folding type portable phone 200. Furthermore, a protection sheet 913 is provided along an external circumference of the curl part 41 and thereby the flexible printed board 40 is protected.

A plurality of hole forming parts 914 are formed at the protection sheet 913. A coaxial cable 903 passes through the hole forming parts 914 so as to wind almost around the external circumference of the first printed board module 117 along the protection sheet 913. The coaxial cable 903 is a coaxial line which connects the first printed board module 117 and the second printed board module 157 and has a length suitable for being approximately half of the wave length $\lambda_1$ of the first using frequency.

Alternatively, instead of the protection sheet 913 having the above mentioned the hole forming parts 914, as shown in FIG. 26, a hole forming part 915 in an axial direction may be provided at the center of the axial member 912 so that the above mentioned coaxial cable 903 may pass through the hole forming part 915.

Thus, the first printed board module 117 provided at the lower chassis 600 and the second printed board module 157 provided at the upper part chassis 500 are connected by the coaxial cable 903 having a length suitable for approximately half of the wave length $\lambda_1$ of the first using frequency in a state where the curl part 41 formed at the flexible printed board 40 is used. Therefore, even if the folding type portable phone 200 is folded so that the upper chassis 500 is closed against the lower part chassis 600, it is possible to apply gamma matching of a folding type portable phone having a full length of approximately $\lambda_1/2$ so that resonance can be achieved at the first using frequency, as well as a state where the folding type portable phone 200 is unfolded.

Thus, the conductive member 902 is extended from the left connection part 400a to the side of the right hinge mechanism part 690 that does not provide electric continuity, so as to form a gap having the length "S'" between the lower part chassis 600 and the conductive member 902. Furthermore, the first printed board module 117 provided at the lower part chassis 600 and the second printed board module 157 provided at the upper part chassis 500 are connected by the coaxial cable 903 having a length suitable for approximately half of the wave length $\lambda_1$ of the first using frequency. Hence, even in a state where the folding type portable phone 200 is folded, resonance at the first and second using frequencies can be achieved.

Thus, according to the folding type portable phone 200 of the second embodiment of the present invention, the upper part chassis 500, the lower part chassis 600, and the hinge mechanism parts 680 and 690 function in a body as an internal antenna at different using frequency bands (dual bands), more particularly as a modified gamma matching type half wavelength dipole antenna having an effective high gain. Accordingly, it is possible to transmit and receive radio waves efficiently at the dual bands so that high quality telephone calling and communicating can be implemented.

Furthermore, resonance can be achieved at respective frequencies by using the internal antenna using the electric notch formed by the upper part chassis 500, the lower part chassis 600, and the hinge mechanism parts 680 and 690 provided inside of the folding type portable phone 200, without providing the external antenna corresponding to the respective frequencies for receiving and sending (for example, a whip antenna) at a space inside of the folding type portable phone 200. Hence, it is possible to minimize the size of the folding type portable phone and make it light weight.

Figure 27:
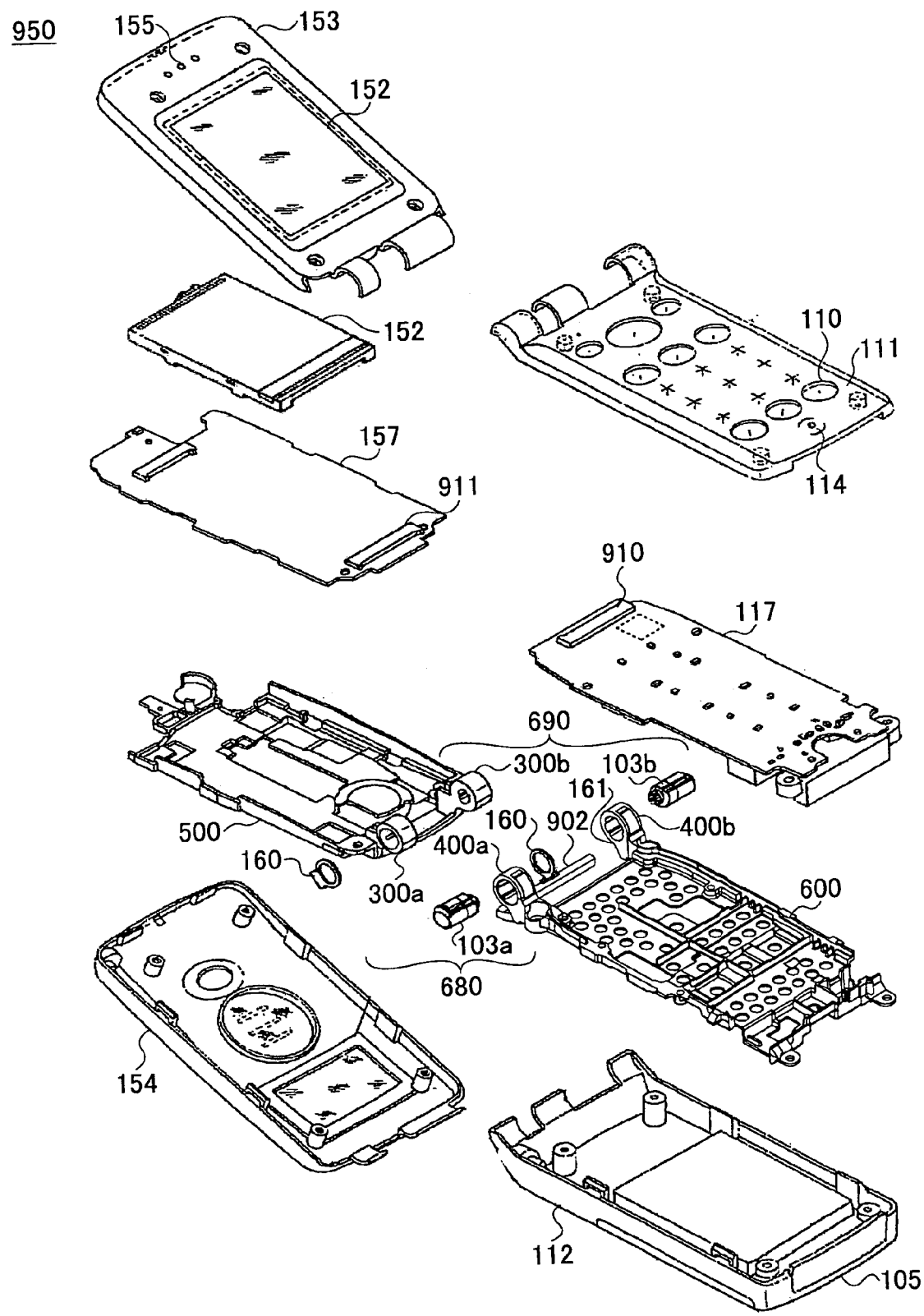
FIG. 27 is an exploded perspective view of a folding type portable phone 950 which is a modified example of the second embodiment of the present invention.

For example, the above mentioned folding type portable phone may be modified to a folding type portable phone 950 shown in FIG. 27. Here, FIG. 27 is an exploded perspective view of a folding type portable phone 950 which is a modified example of the second embodiment of the present invention.

Referring to FIG. 27, the folding type portable phone 950 has a substantially same structure as the above mentioned folding type portable phone 200 except not having the external antenna 150 shown in FIG. 16. As described above, according to the second embodiment of the present invention, since it corresponds to use for the dual bands by only the internal antenna formed in a body by the upper part chassis 500, the lower part chassis 600, and the hinge mechanism parts 680 and 690, an external antenna itself such as a whip antenna is not provided.

According to the structure shown in FIG. 27, a part of the external antenna, extending to the outside of the folding type portable phone 950, is not provided. Hence, it is possible to avoid encountering of an obstacle when the folding type portable phone 950 is taken into/out of a pocket, bag, or the like so that smooth taking in and out can be achieved. Furthermore, it is possible to minimize the size of the folding type portable phone 950 and making the weight thereof light can be achieved. In addition, it is possible to use a space conventionally allocated to the external antenna for other purposes.

Meanwhile, in the respective examples shown in FIG. 15 through FIG. 27, the second embodiment of the present invention is described by using the folding type portable phone. However, the principle (See FIG. 17 through FIG. 19) used in the second embodiment of the present invention can be used for a so-called straight type portable phone, which is used without being folded even at the time of being carried (at the time of waiting for phone calling and at the time of non-communication).

That is, a configuration of a board provided inside of the straight type portable phone is formed as having a plan view of rectangular shape with one side having a part being cut out so that an electric notch is provided in the vicinity of the center of the board. In addition, the long side of the board is set to be suitable for approximately half of the wave length $\lambda_1$ of the first using frequency and the long side of the electric notch is set to be suitable for approximately half of the wave length $\lambda_2$ of the second using frequency.

Under the above mentioned structure, the straight type portable phone is electrically equivalent to a state where the folding type portable phone 200 shown in FIG. 17-(a) is unfolded. Hence, based on the principle of the second embodiment of the present invention described with reference to FIG. 17 through FIG. 19, it is possible to achieve resonance at different using frequency bands so that high quality telephone calling and communicating can be implemented as a modified gamma matching type half wavelength dipole antenna having an effective high gain.

The present invention is not limited to these embodiments, but variations and modifications may be made without departing from the scope of the present invention.

For example, although the folding type portable phone and the chassis thereof are described in the above mentioned embodiments, the present invention is not limited to the above. The present invention may be applied to other kinds of folding type portable radio machines, which are folded at the time of being carried (waiting for being called and communicating, non-communication) and unfolded at the time of being used for telephone calling or communicating, and the chassis of the radio machines.

This patent application is based on Japanese Priority Patent Application No. 2002-274342 filed on Sep. 20, 2002, and Japanese Priority Patent Application No. 2003-92858 filed on Mar. 28, 2003, the entire contents of which are hereby incorporated by reference.

What is claimed is:

1. A folding type portable radio machine, comprising:
   a chassis part formed by a first chassis and a second chassis, the second chassis being foldably connected to the first chassis,
   wherein the chassis part includes:
   a conductive part having conductivity whose full length is approximately a half wave length ($\lambda/2$) of a using frequency of the radio machine, and
   an electric notch provided at a connection part, the connection part foldably connecting the second chassis to the first chassis.

2. The folding type portable radio machine as claimed in claim 1, wherein an antenna is provided at a side of the electric notch.

3. The folding type portable radio machine as claimed in claim 1,
   wherein the conductive part has a width of an approximately one fourth wave length ($\lambda/4$) of the using frequency of the radio machine or shorter, and
   the electric notch has a full length from an approximately one tenth wave length ($\lambda/10$) to an approximately one fourth wave length ($\lambda/4$) of the using frequency of the radio machine.

4. The folding type portable radio machine as claimed in claim 1,
   wherein the conductive part is a printed board module that is provided inside of the first chassis and the second chassis.

5. The folding type portable radio machine as claimed in claim 1,
   wherein the electric notch has a width of an approximately one fourth wave length ($\lambda/4$) of the using frequency of the radio machine.

6. The folding type portable radio machine as claimed in claim 1, further comprising a pair of spaced mechanical hinges interconnecting the first and second chassis, one completing, and the other not completing, an electric circuit therebetween.

7. A folding type portable radio machine, comprising:
   a first chassis having conductivity; and
   a second chassis having conductivity and being foldably connected to the first chassis by a hinge mechanism part,
   wherein the hinge mechanism part has a part making the first chassis and the second chassis have an electric continuity state, and a part not making the first chassis and the second chassis have the electric continuity state, and
   a full length of the first chassis and the second chassis is an approximately half wave length ($\lambda/2$) of a using frequency of the radio machine.

8. The folding type portable radio machine as claimed in claim 7,
   wherein the part making the first chassis and the second chassis have the electric continuity state, of the hinge mechanism part, includes a first connection part provided at a lower part of the first chassis and a second connection part provided at an upper part of the second chassis, and
   a conductor is put between the first connection part and the second connection part.

9. The folding type portable radio machine as claimed in claim 7,
wherein a length between the part making the first chassis and the second chassis electric have the continuity state and the part not making the first chassis and the second chassis have the electric continuity state is an approximately one fourth wave length (λ/4) of the using frequency of the radio machine.

10. The folding type portable radio machine as claimed in claim 7,
wherein a conductive member extends from the part making the first chassis and the second chassis have the electric continuity state to the part not making the first chassis and the second chassis electric have the continuity state, and forms a designated intervals with the second chassis.

11. The folding type portable radio machine as claimed in claim 7, further comprising a coaxial line connecting the first chassis and the second chassis, the coaxial line having a length of the approximately half wave length (λ/2) of the using frequency of the radio machine.

12. The folding type portable radio machine as claimed in claim 11,
further comprising a bendable printed board electrically connecting a printed board module provided inside of the first chassis and a printed board module provided inside of the second chassis,
wherein the coaxial line winds around the bendable printed board.

13. The folding type portable radio machine as claimed in claim 7,
further comprising an antenna being capable of extending against the second chassis, the antenna being provided at a side of the part not making the first chassis and the second chassis have the electric continuity state, of the hinge mechanism part.

14. The folding type portable radio machine as claimed in claim 7, wherein each hinged mechanism part mechanically interconnect the first and second chassis.

15. A folding type portable radio machine, comprising:
a first housing having a first chassis having conductivity where a printed board is provided inside thereof;
a second housing having a second chassis having conductivity where another printed board is provided inside thereof;
an antenna extendable to a back surface of the first housing, the antenna being provided at one of left and right sides of the second housing;
wherein the antenna is fed an electric power supply by a feeder circuit of the other printed board provided inside of the second chassis,
the first chassis and the second chassis being foldably connected by connection parts provided left and right on each of the first chassis and the second chassis,
the connection part at the side where the antenna is positioned non-electrically connects the first chassis and the second chassis,
the connection part at the other side electrically connects the first chassis and the seconds chassis, and
a full length of the radio machine is an approximately half wave length (λ/2) of a using frequency of the radio machine.

16. The folding type portable radio machine as claimed in claim 15,
wherein the first chassis is electrically connected to an earth conductor pattern of the printed board provided inside the first chassis, and
the second chassis is electrically connected to an earth conductor pattern of the printed board provided inside the second chassis.

17. The folding type portable radio machine as claimed in claim 15, wherein the hinged mechanism part mechanically interconnects the first and second chassis.

18. A folding type portable radio machine, comprising:
a first housing that has a first chassis having conductivity, the first housing having a printed board provided inside thereof; and
a second housing that has a second chassis having conductivity, the second housing having another printed board provided inside thereof;
wherein the first chassis and the second chassis are physically connected by a first connection part and a second connection part provided left and right,
the first connection part electrically connects the first chassis and the second chassis,
the second connection part does not electrically connect the first chassis and the second chassis,
a full length of the radio machine in a case where the first housing is opened from the second housing is an approximately half wave length (λ/2) of a first using frequency of the radio machine;
an interval between the first connection part and the second connection part is an approximately one fourth wave length (λ/4) of a second using frequency of the radio machine; and
the first chassis, the second chassis, the first connection part, and the second connection part, as an installed antenna of the radio machine, send and receive radio waves having the first and second using frequencies.

19. The folding type portable radio machine as recited in claim 18, wherein the first and second connection parts mechanically interconnect the first and second chassis and define an axis of rotation therebetween.

20. A chassis provided inside of a folding type portable radio machine, comprising:
a first chassis part;
a second chassis part;
first and second pluralities of connection parts provided at the first chassis part and a plurality of second connection parts corresponding to the first connection parts and provided at the second chassis part, respectively connecting the first chassis part and the second chassis part; and
a conductive member forming a designated interval with the second chassis and extending from the vicinity of the one connection part of the second chassis part to another connection part of the second chassis,
wherein a surface of one of the connection parts at the second chassis part connecting to the one of the connection parts at the first chassis part is made of non-conductive material.

* * * * *

UNITED STATES PATENT AND TRADEMARK OFFICE
CERTIFICATE OF CORRECTION

PATENT NO. : 7,283,853 B2 Page 1 of 1
APPLICATION NO. : 10/664024
DATED : October 16, 2007
INVENTOR(S) : Masaru Kanazawa et al.

It is certified that error appears in the above-identified patent and that said Letters Patent is hereby corrected as shown below:

Column 24, Line 28, change "(A/2)" to --($\lambda$/2)--.

Signed and Sealed this

Fifteenth Day of April, 2008

JON W. DUDAS
*Director of the United States Patent and Trademark Office*